(12) United States Patent
Dimou et al.

(10) Patent No.: US 12,170,990 B2
(45) Date of Patent: Dec. 17, 2024

(54) COMPONENT CARRIER (CC) SELECTION FOR A USER EQUIPMENT (UE) BASED ON ONE OR MORE CC SELECTION CRITERIA

(71) Applicant: QUALCOMM Incorporated, San Diego, CA (US)

(72) Inventors: Konstantinos Dimou, San Francisco, CA (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 337 days.

(21) Appl. No.: 17/646,316

(22) Filed: Dec. 29, 2021

(65) Prior Publication Data

US 2022/0248403 A1 Aug. 4, 2022

Related U.S. Application Data

(60) Provisional application No. 63/144,429, filed on Feb. 1, 2021.

(51) Int. Cl.
*H04W 72/0453* (2023.01)
*H04L 1/1812* (2023.01)
*H04L 5/00* (2006.01)
*H04W 72/56* (2023.01)

(52) U.S. Cl.
CPC ....... *H04W 72/0453* (2013.01); *H04L 1/1812* (2013.01); *H04L 5/001* (2013.01); *H04W 72/56* (2023.01)

(58) Field of Classification Search
CPC ............ H04W 72/02; H04W 72/0453; H04W 72/23; H04W 72/231–232; H04W 72/40; H04L 5/0055; H04L 5/001
See application file for complete search history.

(56) References Cited

U.S. PATENT DOCUMENTS

| | | | |
|---|---|---|---|
| 2018/0262377 A1* | 9/2018 | Liu | H04L 5/0057 |
| 2019/0081739 A1* | 3/2019 | Nammi | H04L 1/1858 |
| 2021/0195639 A1* | 6/2021 | Kim | H04W 16/14 |
| 2023/0275738 A1* | 8/2023 | Tang | H04L 5/0092 370/330 |
| 2023/0379095 A1* | 11/2023 | Kittichokechai | H04L 1/1854 |

* cited by examiner

*Primary Examiner* — Kevin C. Harper
(74) *Attorney, Agent, or Firm* — Norton Rose Fulbright LLP

(57) ABSTRACT

A method of wireless communication by a user equipment (UE) includes receiving one or more configuration messages indicating a plurality of component carriers (CCs) and one or more CC selection criteria associated with the plurality of CCs. The method further includes receiving a downlink message and transmitting, based on the downlink message, one or more repetitions of a hybrid automatic repeat request (HARQ) feedback message using a particular CC of the plurality of CCs. The particular CC is selected by the UE from the plurality of CCs based on the one or more CC selection criteria.

30 Claims, 12 Drawing Sheets

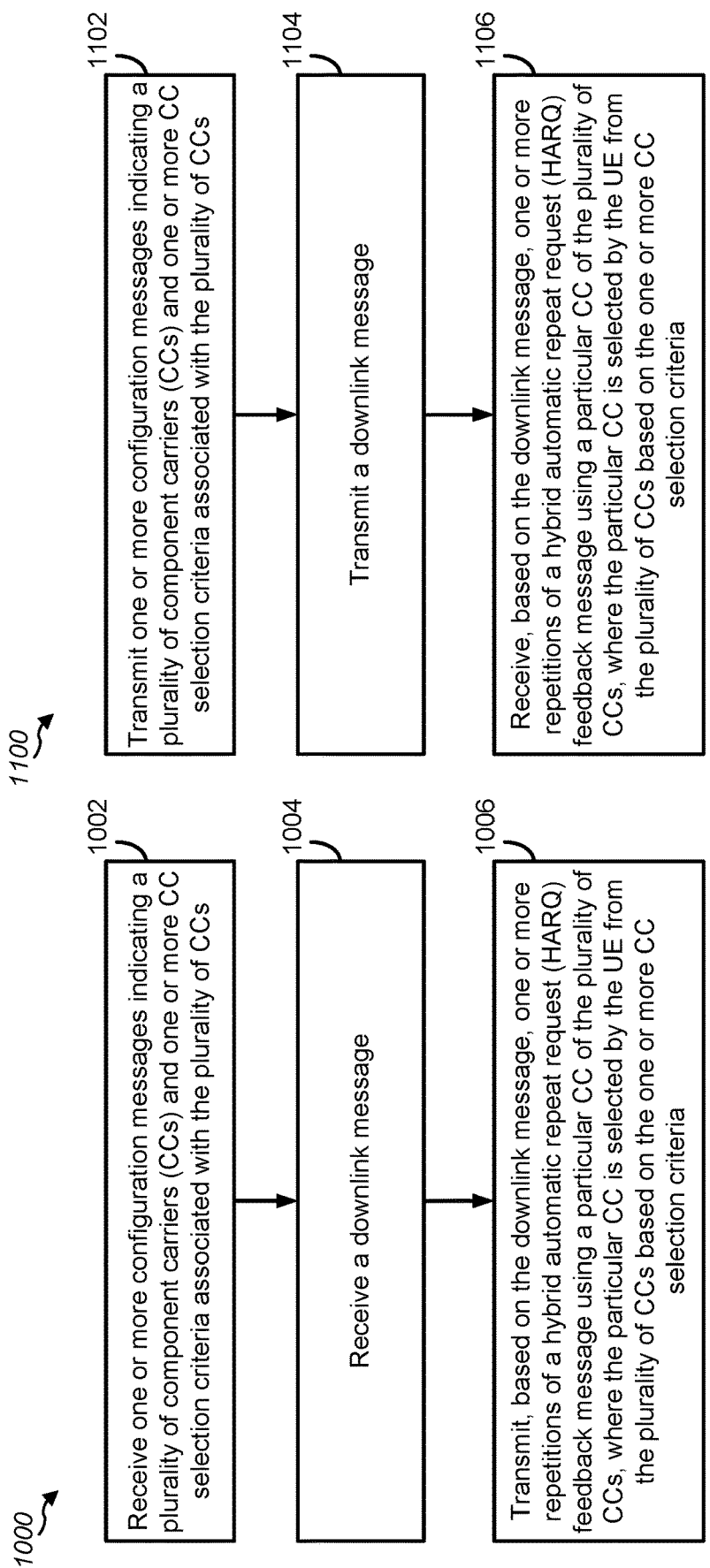

COMPONENT CARRIER (CC) SELECTION FOR A USER EQUIPMENT (UE) BASED ON ONE OR MORE CC SELECTION CRITERIA

CROSS-REFERENCE TO RELATED APPLICATIONS

This application claims the benefit of U.S. Provisional Patent Application No. 63/144,429, entitled, "COMPONENT CARRIER (CC) SELECTION FOR A USER EQUIPMENT (UE) BASED ON ONE OR MORE CC SELECTION CRITERIA," filed on Feb. 1, 2021, which is expressly incorporated by reference herein in its entirety.

TECHNICAL FIELD

Aspects of the present disclosure relate generally to wireless communication systems, and more particularly, to wireless communication systems that transmit signals using multiple carriers, such as component carriers (CCs).

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication by a user equipment (UE) includes receiving one or more configuration messages indicating a plurality of component carriers (CCs) and one or more CC selection criteria associated with the plurality of CCs. The method further includes receiving a downlink message and transmitting, based on the downlink message, one or more repetitions of a hybrid automatic repeat request (HARQ) feedback message using a particular CC of the plurality of CCs. The particular CC is selected by the UE from the plurality of CCs based on the one or more CC selection criteria.

In some other aspects of the disclosure, an apparatus includes a receiver configured to receive one or more configuration messages indicating a plurality of component carriers (CCs) and one or more CC selection criteria associated with the plurality of CCs. The receiver is further configured to receive a downlink message. The apparatus further includes a transmitter configured to transmit, based on the downlink message, one or more repetitions of a hybrid automatic repeat request (HARQ) feedback message using a particular CC of the plurality of CCs. The particular CC is selected from the plurality of CCs based on the one or more CC selection criteria.

In some other aspects of the disclosure, a non-transitory computer-readable medium stores instructions executable by a processor to initiate, perform, or control operations. The operations include receiving one or more configuration messages indicating a plurality of component carriers (CCs) and one or more CC selection criteria associated with the plurality of CCs. The operations further include receiving a downlink message and transmitting, based on the downlink message, one or more repetitions of a hybrid automatic repeat request (HARQ) feedback message using a particular CC of the plurality of CCs. The particular CC is selected from the plurality of CCs based on the one or more CC selection criteria.

In some other aspects of the disclosure, an apparatus includes means for receiving one or more configuration messages indicating a plurality of component carriers (CCs) and one or more CC selection criteria associated with the plurality of CCs and for receiving a downlink message. The apparatus further includes means for transmitting, based on the downlink message, one or more repetitions of a hybrid automatic repeat request (HARQ) feedback message using a particular CC of the plurality of CCs. The particular CC is selected from the plurality of CCs based on the one or more CC selection criteria.

In some other aspects of the disclosure, a method of wireless communication by a base station includes transmitting one or more configuration messages indicating a plurality of component carriers (CCs) and one or more CC selection criteria associated with the plurality of CCs. The method further includes transmitting a downlink message and receiving, based on the downlink message, one or more repetitions of a hybrid automatic repeat request (HARQ) feedback message using a particular CC of the plurality of CCs. The particular CC is selected from the plurality of CCs based on the one or more CC selection criteria.

In some other aspects of the disclosure, an apparatus includes a transmitter configured to transmit one or more configuration messages indicating a plurality of component carriers (CCs) and one or more CC selection criteria associated with the plurality of CCs. The transmitter is further configured to transmit a downlink message. The apparatus further includes a receiver configured to receive, based on the downlink message, one or more repetitions of a hybrid automatic repeat request (HARQ) feedback message using a particular CC of the plurality of CCs. The particular CC is selected from the plurality of CCs based on the one or more CC selection criteria.

In some other aspects of the disclosure, a non-transitory computer-readable medium stores instructions executable by a processor to initiate, perform, or control operations. The operations include transmitting one or more configuration messages indicating a plurality of component carriers (CCs) and one or more CC selection criteria associated with the plurality of CCs. The operations further include transmitting a downlink message and receiving, based on the downlink message, one or more repetitions of a hybrid automatic repeat request (HARQ) feedback message using a particular CC of the plurality of CCs. The particular CC is selected from the plurality of CCs based on the one or more CC selection criteria.

In some other aspects of the disclosure, an apparatus includes means for transmitting one or more configuration messages indicating a plurality of component carriers (CCs) and one or more CC selection criteria associated with the plurality of CCs and for transmitting a downlink message. The apparatus further includes means for receiving, based on the downlink message, one or more repetitions of a hybrid automatic repeat request (HARQ) feedback message using a particular CC of the plurality of CCs. The particular CC is selected from the plurality of CCs based on the one or more CC selection criteria.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a flow chart illustrating an example of a method of wireless communication by a UE according to some aspects of the disclosure.

FIG. 11 is a flow chart illustrating an example of a method of wireless communication by a base station according to some aspects of the disclosure.

DETAILED DESCRIPTION

Figure 1:
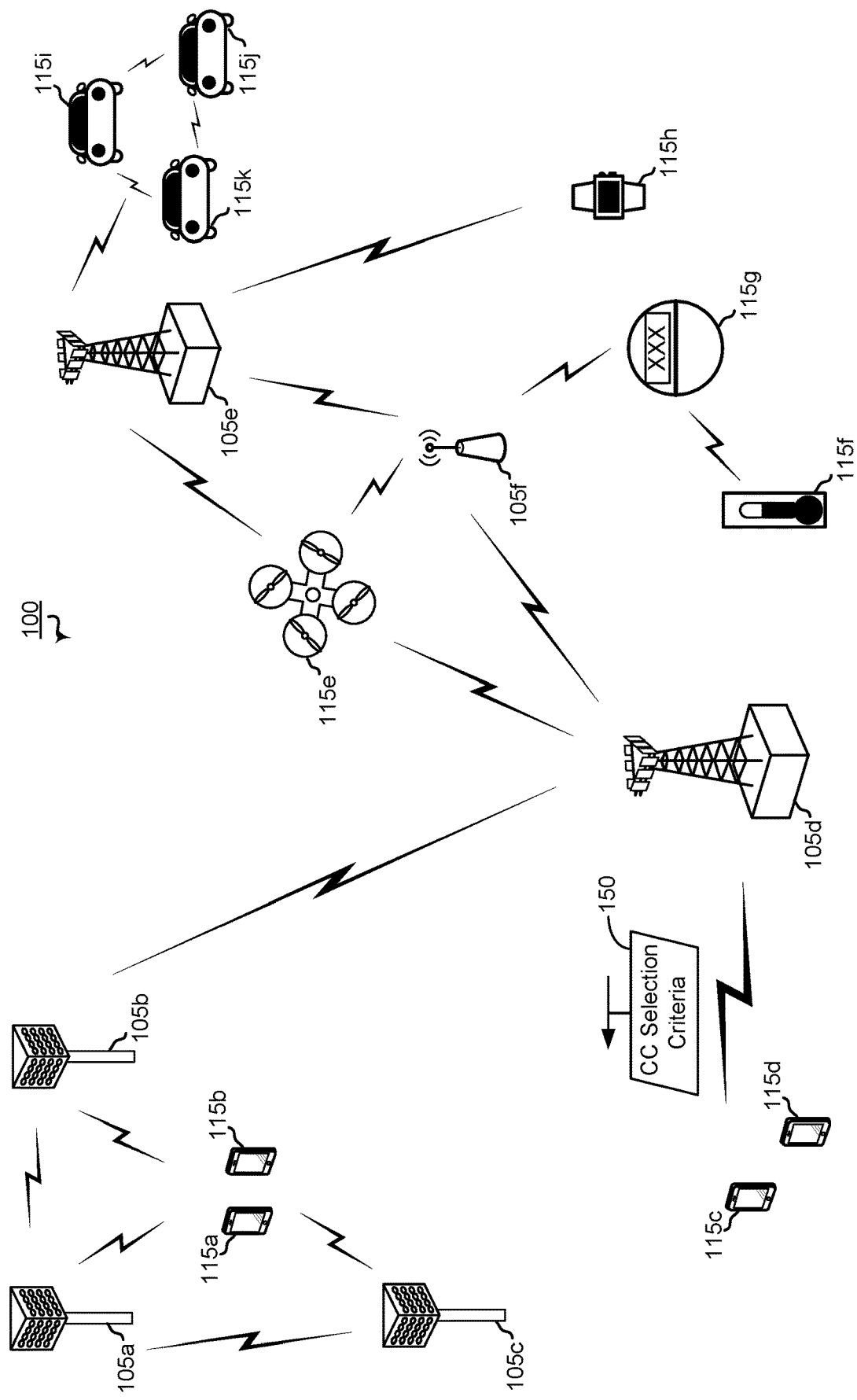
FIG. 1 is a block diagram illustrating an example of a wireless communication system according to some aspects of the disclosure.

Some wireless communication systems use carrier switching to change a carrier used for communication. For example, a base station may indicate to a user equipment (UE) to perform a carrier switching operation from a first carrier to a second carrier, such as in response to an increase in channel quality in the second carrier. In this case, use of the second carrier instead of the first carrier may improve reliability of a signal transmitted by the UE to the base station. Measurement of channel qualities of carriers may use time and processing resources. Further, signaling used to transmit an indication of the selected carrier may use wireless resources of a wireless communication system.

In some aspects of the disclosure, a base station transmits to a UE an indication of one or more component carrier (CC) selection criteria. The UE may use the one or more CC selection criteria to determine a CC for an uplink transmission, such as to determine whether to perform a carrier switching operation from a first CC to a second CC. In some cases, the base station indicates the one or more CC selection criteria in response to determining that channel qualities of the CCs are similar or the same. In some examples, the UE may use the one or more CC selection criteria to select a particular CC for transmission of one or more repetitions of a physical uplink control channel (PUCCH) transmission, such as one or more repetitions of a hybrid automatic repeat request (HARQ) feedback message.

In some aspects, the UE may be configured with a priority scheme that specifies priorities of multiple selection criteria for determining the particular CC. As an illustrative example, the selection criteria may specify that the UE is to select the particular CC having the fewest number (or cardinality) of repetitions among the CCs, and that if the CCs are associated with the same cardinality, then the UE is to "fall back" to selection based on index values associated with the CCs, such as by selecting the CC having the lowest (or greatest) index value. In such examples, the cardinality of repetitions may be associated with a priority that is greater than a priority associated with the index values. To further illustrate, in some implementations, the one or more CC selection criteria may include one or more of an end transmission time criterion, a resource availability criterion, a repetition number criterion, a percentage of available repetitions criterion, or a CC index value criterion, which each may be associated with a respective priority.

By using the one or more CC selection criteria, performance may be improved in some situations. As an illustrative example, the one or more CC selection criteria may specify that the UE is to select the particular CC having the fewest number (or cardinality) of repetitions among the CCs (which may imply that the particular CC is associated with a greater reliability in some cases). As another illustrative example, the one or more CC selection criteria may specify that the UE is to select the particular CC based on an index value associated with the particular CC, such as by selecting the CC having the lowest (or greatest) index value. In some examples, a lower (or greater) index value may indicate a lower frequency, which may be associated with increased reliability in some wireless communication protocols.

Alternatively or in addition, dynamically selecting a particular CC based on the one or more CC selection criteria may reduce an amount of signaling overhead used to explicitly indicate a selected CC to the UE. By reducing the amount of signaling overhead, an amount of resources available for other operations may be increased. For example, instead of using resources to explicitly indicate a selected CC to the UE, the resources may instead be used to increase bandwidth of one or more other communications, which may improve performance of a wireless communication system.

To further illustrate, aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunication system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km^2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km¨2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth.

For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communication systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

In some aspects, a base station 105 may transmit, to one or more UEs 115, an indication of one or more component carrier (CC) selection criteria 150. For example, the base station 105d may transmit an indication of the one more CC selection criteria 150 to one or both of the UE 115c or the UE 115d. Alternatively or in addition, one or more other base stations 105 may transmit an indication of the one more CC selection criteria 150 to one or more other UEs 115.

Figure 2:
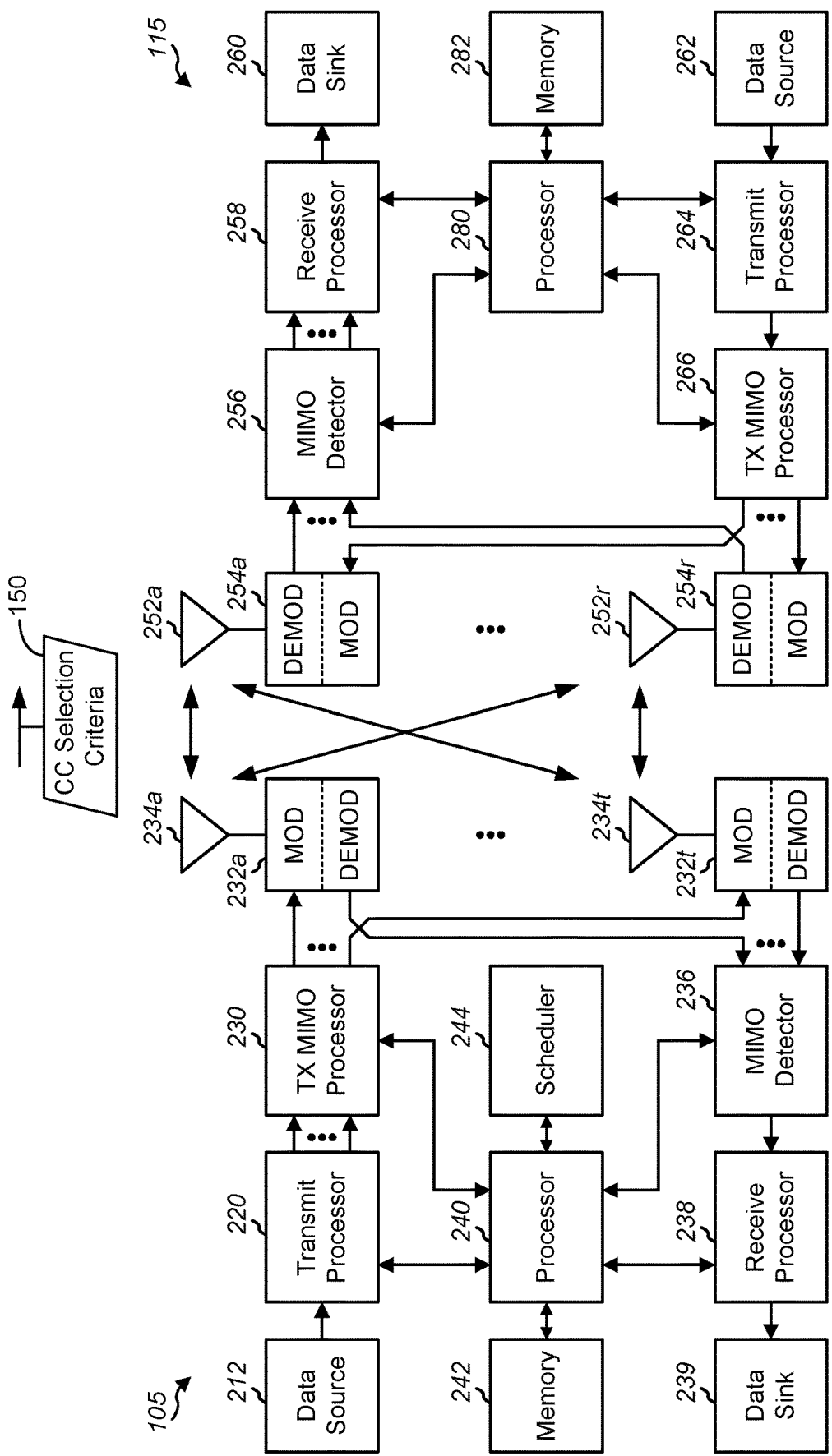
FIG. 2 is a block diagram illustrating examples of a base station and a UE according to some aspects of the disclosure.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the processor 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the processor 240.

The processors 240 and 280 may direct the operation at the base station 105 and the UE 115, respectively. The processor 240 or other processors and modules at the base station 105 or the processor 280 or other processors and modules at the UE 115 may perform or direct the execution of various processes for the techniques described herein, such as transmission or reception of an indication of the one or more CC selection criteria 150. The memories 242 and 282 may store data and program codes for the base station 105 and the UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
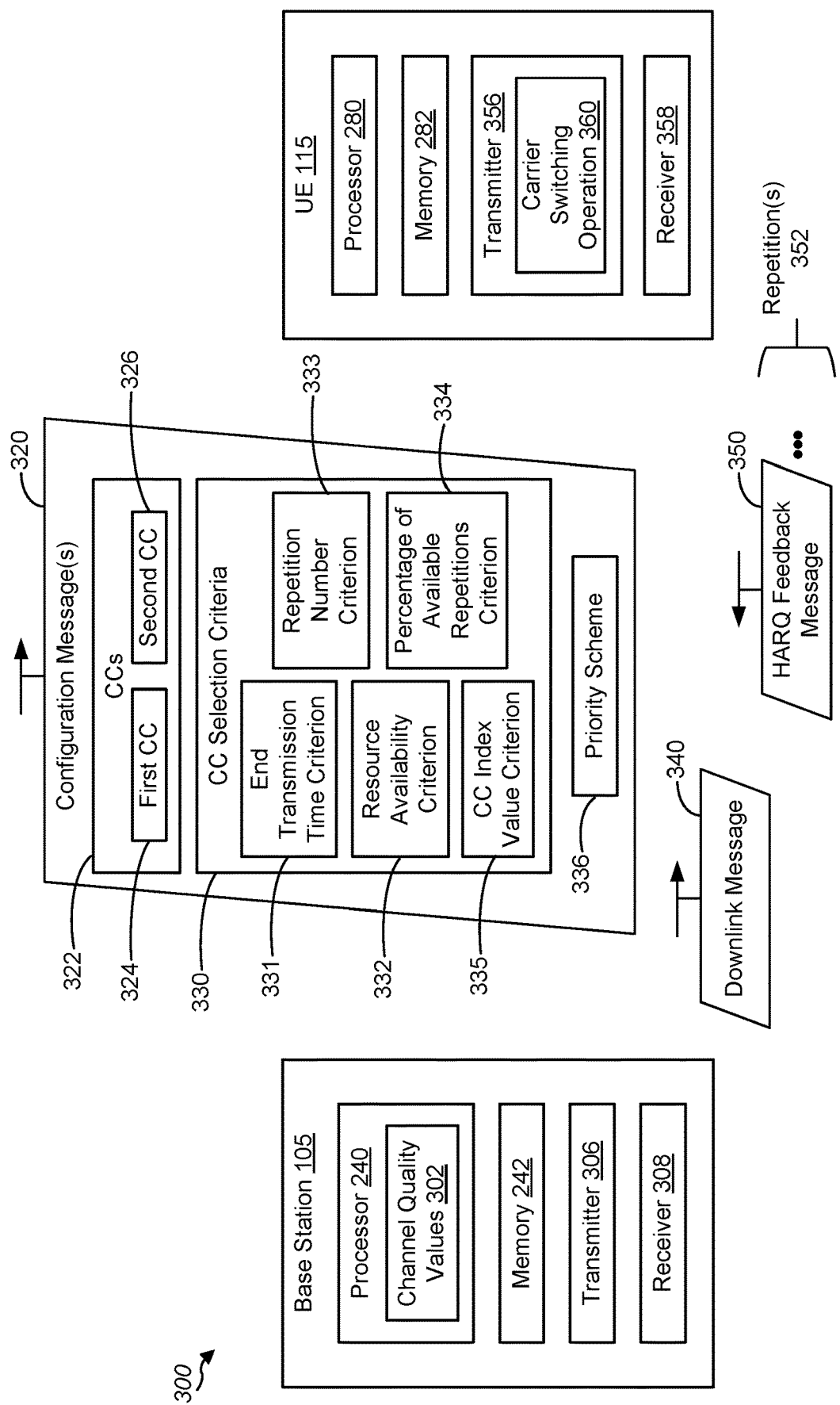
FIG. 3 is a block diagram illustrating an example of a wireless communication system.

FIG. 3 is a block diagram illustrating an example of a wireless communication system 300 according to some aspects of the disclosure. The wireless communication system 300 may include one or more base stations, such as the base station 105, and may further include one or more UEs, such as the UE 115.

The example of FIG. 3 illustrates that the base station 105 may include one or more processors (e.g., the processor 240) and may include the memory 242. The base station 105 may further include a transmitter 306 and a receiver 308. The processor 240 may be coupled to the memory 242, to the transmitter 306, and to the receiver 308. In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230.

FIG. 3 also illustrates that the UE 115 may include one or more processors (e.g., the processor 280) and may include the memory 282. The UE 115 may further include a transmitter 356 and a receiver 358. The processor 280 may be coupled to the memory 282, to the transmitter 356, and to the receiver 358. In some examples, the transmitter 356 and the receiver 358 include one or more components described with reference to FIG. 2, such as one or more of the modulator/demodulators 254a-r, the MIMO detector 256, the receive processor 258, the transmit processor 264, or the TX MIMO processor 266.

During operation, the base station 105 may transmit one or more configuration messages 320 to the UE 115. In some examples, the one or more configuration messages 320 indicate component carriers (CCs) 322, such as a first CC 324 and a second CC 326. The one or more configuration messages 320 may also indicate one or more CC selection criteria 330 (e.g., the one or more CC selection criteria 150) associated with the plurality of CCs 322. In some examples, the one or more the CC selection criteria 330 may include one or more of an end transmission time criterion 331, a resource availability criterion 332, a repetition number criterion 333, a percentage of available repetitions criterion 334, a CC index value criterion 335, or one or more other criteria. In some implementations, the one or more configuration messages 320 may indicate a priority scheme 336 associated with the one or more CC selection criteria 330. In some examples, the one or more configuration messages 320 correspond to radio resource control (RRC) configuration messages. In some examples, the one or more configuration messages 320 include downlink control information (DCI).

The UE 115 may use the one or more CC selection criteria 330 to select a particular CC from among the CCs 322, such as in connection with a carrier switching operation 360. To illustrate, in some circumstances, the base station 105 may determine that channel quality values 302 associated with the CCs 322 are similar, such as by determining that difference in channel quality between the CCs 322 is less than a threshold difference. In this case, the base station 105 may enable the UE 115 to determine (e.g., based on the one or more CC selection criteria 330) to select the particular from among the CCs 322. For example, based on the difference in channel quality between the CCs 322 being less than a threshold difference, the downlink message 340 may not include an indication of the particular CC, and indication of the one or more CC selection criteria 330 may enable the UE 115 to the perform carrier switching operation 360 among the CCs 322 without the indication of the particular CC.

To further illustrate, after transmitting the one or more configuration messages 320, the base station 105 may transmit a downlink message 340 to the UE 115. For example, the downlink message may include a physical downlink shared channel (PDSCH) message transmitted via a PDSCH. The UE 115 may generate a hybrid automatic repeat request (HARQ) feedback message 350 based on the downlink message 340. For example, the HARQ feedback message 350 may indicate one or more acknowledgements (ACKs) associated with one or more HARQ processes executed by the UE 115, one or more negative acknowledgements (NACKs) associated with one or more HARQ processes executed by the UE 115, or a combination thereof. The HARQ feedback message 350 may be transmitted via a physical uplink control channel (PUCCH).

In some wireless communication protocols, the UE 115 transmits one or more repetitions 352 of the HARQ feedback message 350 (e.g., to increase reliability associated with transmission of the HARQ feedback message 350). In some aspects of the disclosure, the UE 115 may select a particular CC of the CCs based on the one or more CC selection criteria 330 and may transmit the one or more repetitions 352 of the HARQ feedback message 350 using the particular CC.

To further illustrate, FIGS. 4-8 illustrate certain examples in accordance with the one or more CC selection criteria 330 according to some aspects of the disclosure. In FIGS. 4-8, repetitions (or scheduled repetitions) for one or more HARQ feedback messages (such as the HARQ feedback message 350) are illustrated. The UE 115 may transmit the repetitions via a physical control channel (PUCCH). FIGS. 4-8 also depict that the base station 105 may perform a physical downlink shared channel (PDSCH) transmission to the UE 115.

In some implementations, a slot may be indicated in FIGS. 4-8 by a dashed box. In some examples, a slot may be associated with a group of symbols, and a group of slots may correspond to a cycle. In some illustrative implementations, a slot may include fourteen symbols, and a cycle may include eight slots (and 112 symbols). In some illustrative implementations, a slot may have a duration of 124 microseconds (μs), and a cycle may have a duration of one millisecond (ms). Other examples and other values are also within the scope of the disclosure.

Figure 4:
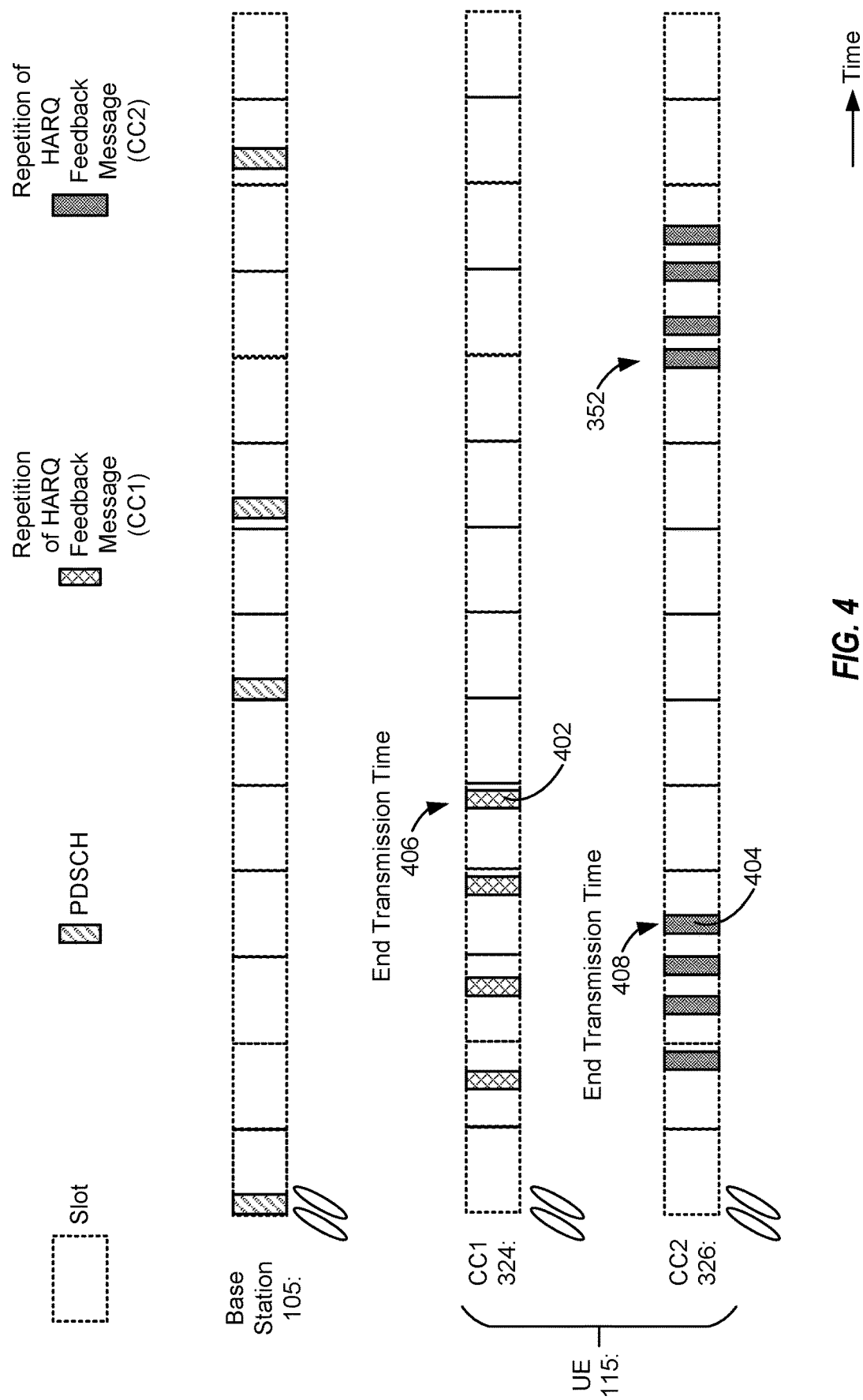
FIG. 4 is a timing diagram illustrating example operations of a base station and a UE based on an example of an end transmission time criterion according to some aspects of the disclosure.

FIG. 4 is a timing diagram illustrating example operations of the base station 105 and the UE 115 based on an example of the end transmission time criterion 331 according to some aspects of the disclosure. FIG. 4 illustrates that at least some CCs may be associated with different respective time resources reserved for repetitions of a PUCCH signal, such as the HARQ feedback message 350. To illustrate, in the example of FIG. 4, a group of repetitions transmitted via the first CC 324 may be scheduled to use different time resources as compared to a group repetitions transmitted via the second CC 326. For example, a final repetition 402 of the group of repetitions transmitted via the first CC 324 may be scheduled to use time resources that occur after time resources scheduled for a final repetition 404 of the group of repetitions transmitted via the second CC 326.

The UE 115 may determine that an end transmission time 408 associated with the group of repetitions transmitted via the second CC 326 is to occur sooner than an end transmission time 406 associated with the group of repetitions transmitted via the first CC 324. Based on determining that the end transmission time 408 associated with the group of repetitions transmitted via the second CC 326 is to occur sooner than the end transmission time 406 associated with the group of repetitions transmitted via the first CC 324, the UE 115 may determine that the end transmission time 408 associated with the group of repetitions transmitted via the second CC 326 satisfies the end transmission time criterion 331. As a result, the UE 115 may perform the carrier switching operation 360 from the first CC 324 to the second CC 326 and may transmit the one or more repetitions 352 via the second CC 326.

Figure 5:
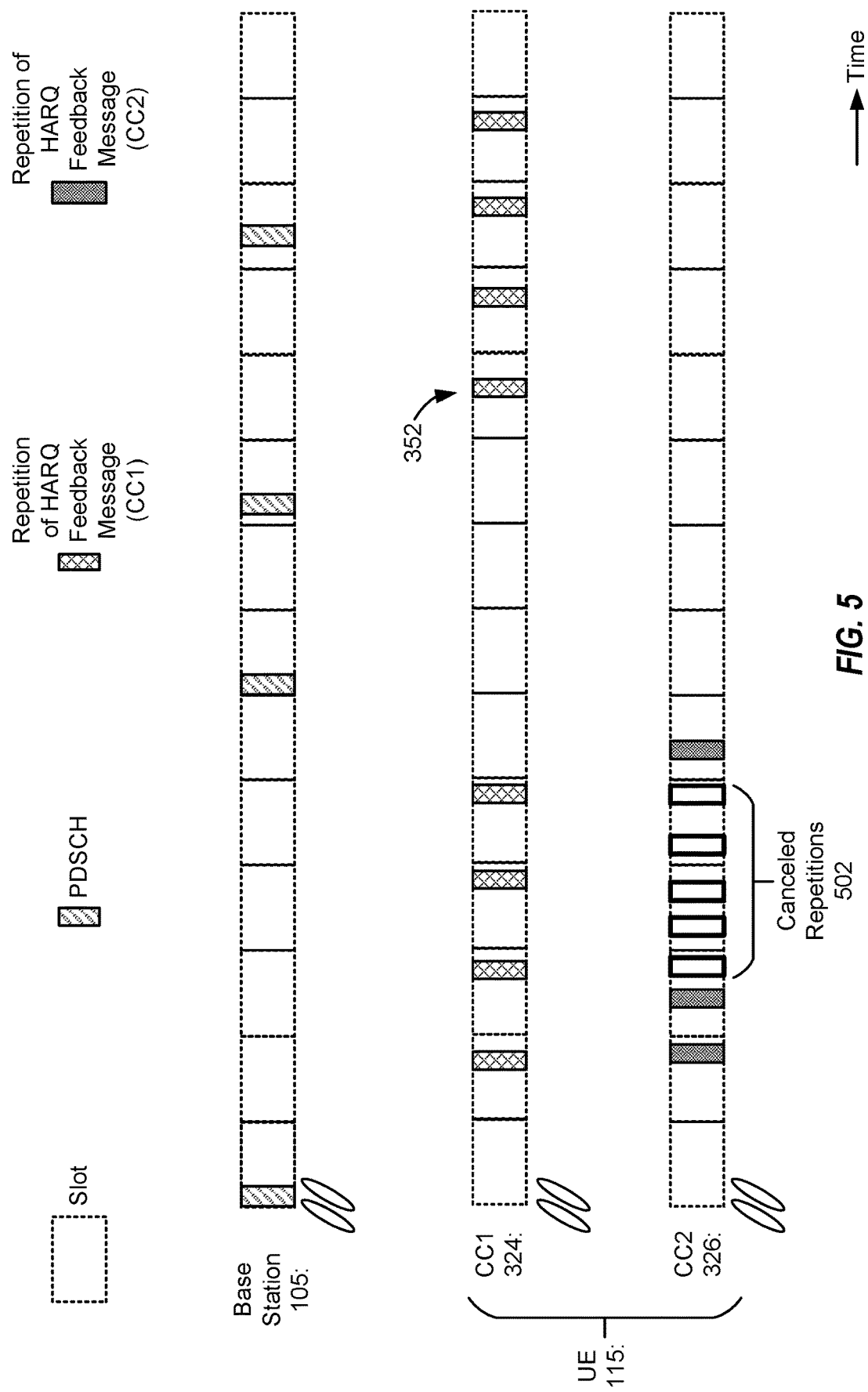
FIG. 5 is a timing diagram illustrating example operations of a base station and a UE based on an example of a resource availability criterion according to some aspects of the disclosure.

FIG. 5 is a timing diagram illustrating example operations of the base station 105 and the UE 115 based on an example of the resource availability criterion 332 according to some aspects of the disclosure. In the example of FIG. 5, the base station 105 may cancel resources associated with the second CC 326 (e.g., to reschedule the resources for one or more other operations or communications, such as a higher priority communication), resulting in canceled repetitions 502. In some such examples, the base station 105 may transmit to the UE 115 a control message indicating that the resources are unavailable to the UE 115. Based on the control message, the UE 115 may determine that a resource availability associated with the particular CC satisfies the resource availability criterion 332 (e.g., because the first CC 324 is associated with a greater number of available resources as compared to the second CC 326). As a result, the UE 115 may transmit the one or more repetitions 352 via the first CC 324.

Figure 6:
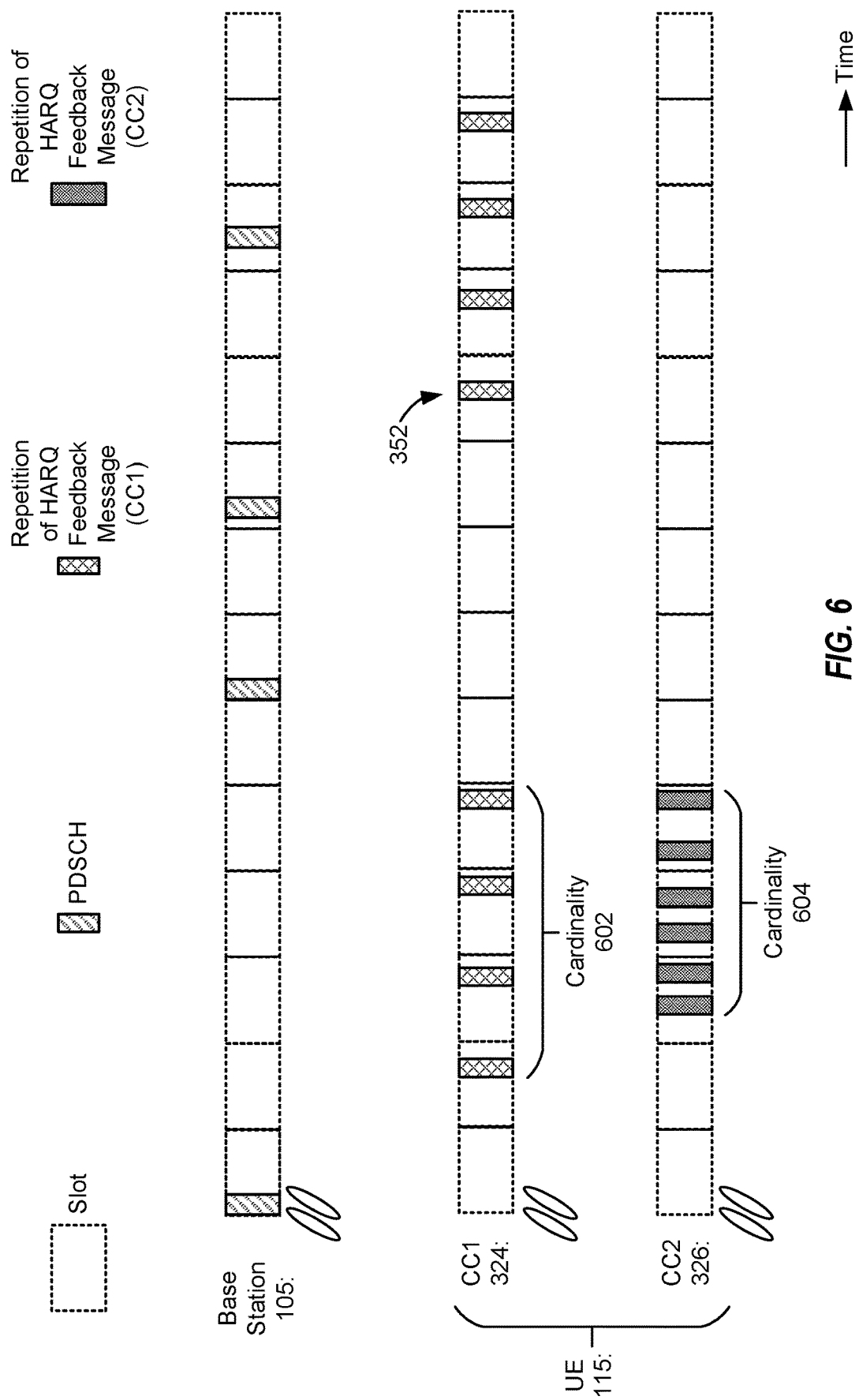
FIG. 6 is a timing diagram illustrating example operations of a base station and a UE based on an example of the repetition number criterion according to some aspects of the disclosure.

FIG. 6 is a timing diagram illustrating example operations of the base station 105 and the UE 115 based on an example of the repetition number criterion 333 according to some aspects of the disclosure. The repetition number criterion 333 may specify that the UE 115 is to select the particular CC having the fewest number (or cardinality) of repetitions among the CCs 322 (which may imply that the particular CC is associated with a greater reliability in some cases). To illustrate, the UE 115 may determine that a cardinality 602 (e.g., four) of repetitions associated with the first CC 324 is less a 604 cardinality (e.g., six) of repetitions associated with the second CC 326. Based on the cardinality 602 of repetitions associated with the first CC 324 being less than the cardinality 604 of repetitions associated with the second CC 326, the UE 115 may determine that the cardinality 602 of repetitions associated with the first CC 324 satisfies the repetition number criterion 333. As a result, the UE 115 may transmit the one or more repetitions 352 via the first CC 324.

Figure 7:
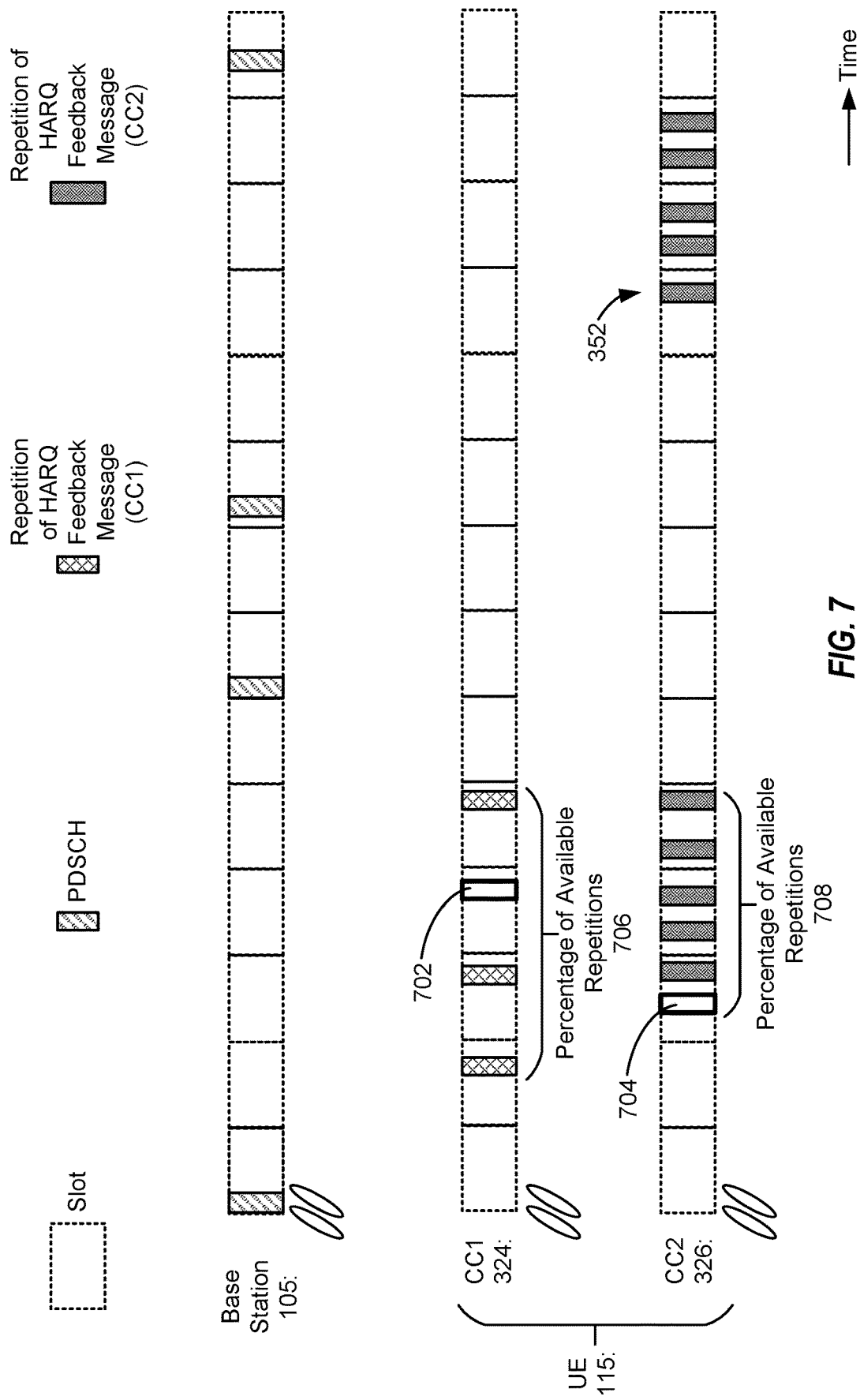
FIG. 7 is a timing diagram illustrating example operations of a base station and a UE based on an example of a percentage of available repetitions criterion according to some aspects of the disclosure.

FIG. 7 is a timing diagram illustrating example operations of the base station 105 and the UE 115 based on an example of the percentage of available repetitions criterion 334 according to some aspects of the disclosure. The percentage of available repetitions criterion 334 may specify that the UE 115 is to select the particular CC having the greatest percentage (or ratio) of available repetitions to total repetitions (where the total repetitions include both available repetitions and repetitions that are unavailable due to resource cancelation). For example, a repetition may be unavailable to the UE 115 based on receiving a control message indicating that resources associated with the repetition are unavailable to the UE 115.

To illustrate, in FIG. 7, the first CC 324 is associated with three available repetitions and four total repetitions (where one repetition 702 is unavailable due to resource cancelation), and the second CC 326 is associated with five available repetitions and six total repetitions (where one repetition 704 is unavailable due to resource cancelation). In this example, the UE 115 may determine that the first CC 324 is associated with a percentage of available repetitions 706 corresponding to 75 percent and that the second CC 326 is associated with a percentage of available repetitions 708 corresponding to 83 percent. In this example, the UE 115 may determine that the percentage of available repetitions 708 associated with the second CC 326 satisfies the percentage of available repetitions criterion 334 (e.g., based on the percentage of available repetitions 708 exceeding the percentage of available repetitions 706). As a result, the UE 115 may perform the carrier switching operation 360 from the first CC 324 to the second CC 326 and may transmit the one or more repetitions 352 via the second CC 326.

Figure 8:
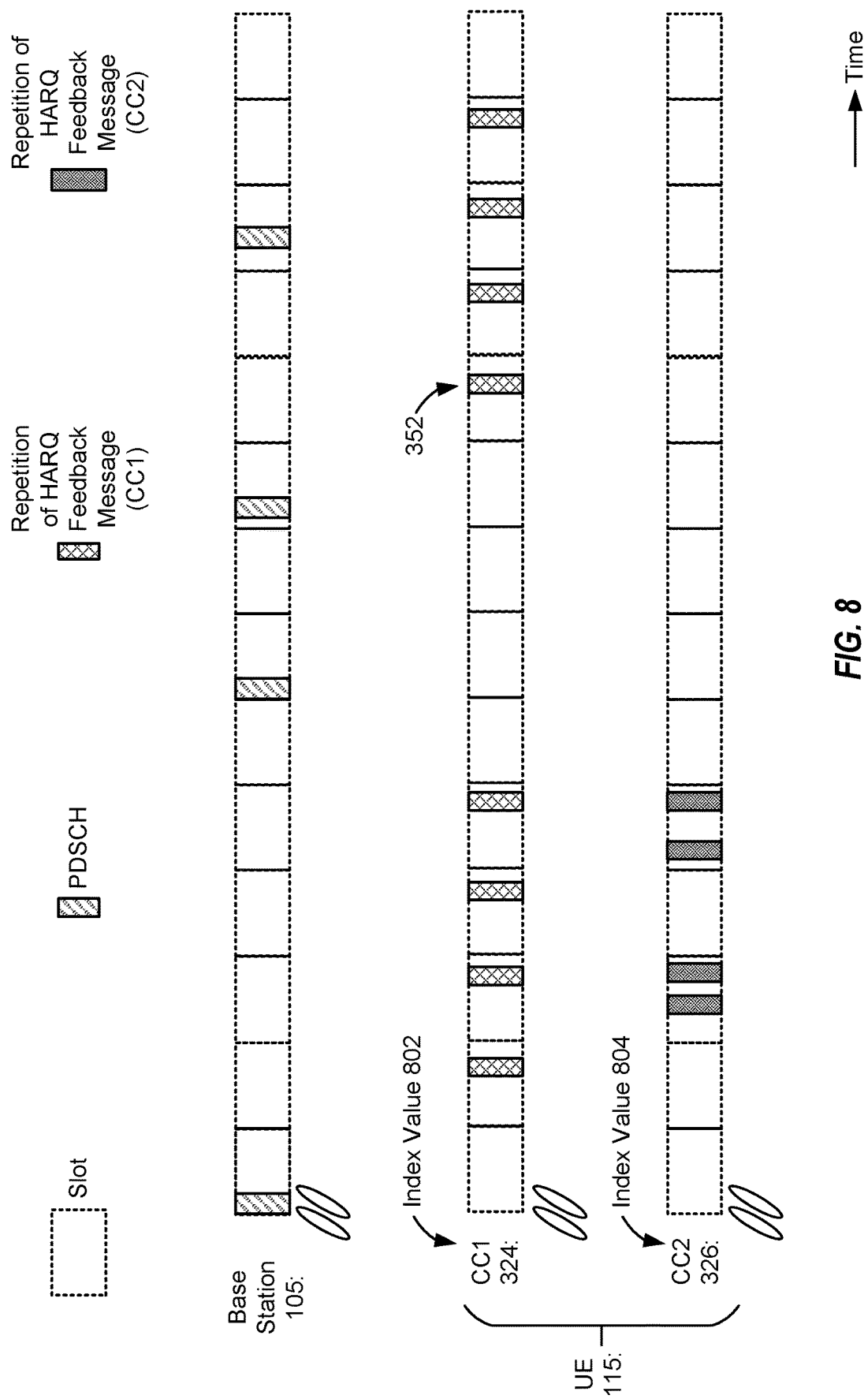
FIG. 8 is a timing diagram illustrating example operations of a base station and a UE based on an example of a CC index value criterion according to some aspects of the disclosure.

FIG. 8 is a timing diagram illustrating example operations of the base station 105 and the UE 115 based on an example of the CC index value criterion 335 according to some aspects of the disclosure. In some examples, the CC index value criterion 335 specifies that the UE 115 is to select a particular CC based on an index value associated with the particular CC, such as by selecting the CC having the lowest index value. In some examples, a lower index value may indicate a lower frequency, which may be associated with increased reliability in some wireless communication protocols. In some other implementations, the CC index value criterion 335 may specify selection of a CC based on another index value, such as based on the greatest index value.

In FIG. 8, the UE 115 may determine that an index value 802 associated with the first CC 324 (e.g., "1") is less than an index value 804 associated with the second CC 326 (e.g., "2"). Based on the index value 802 associated with the first CC 324 being less than the index value 804 associated with the second CC 326, the UE 115 may determine that the index value 802 associated with the first CC 324 satisfies the CC index value criterion 335. As a result, the UE 115 may transmit the one or more repetitions 352 via the first CC 324.

Figure 9:
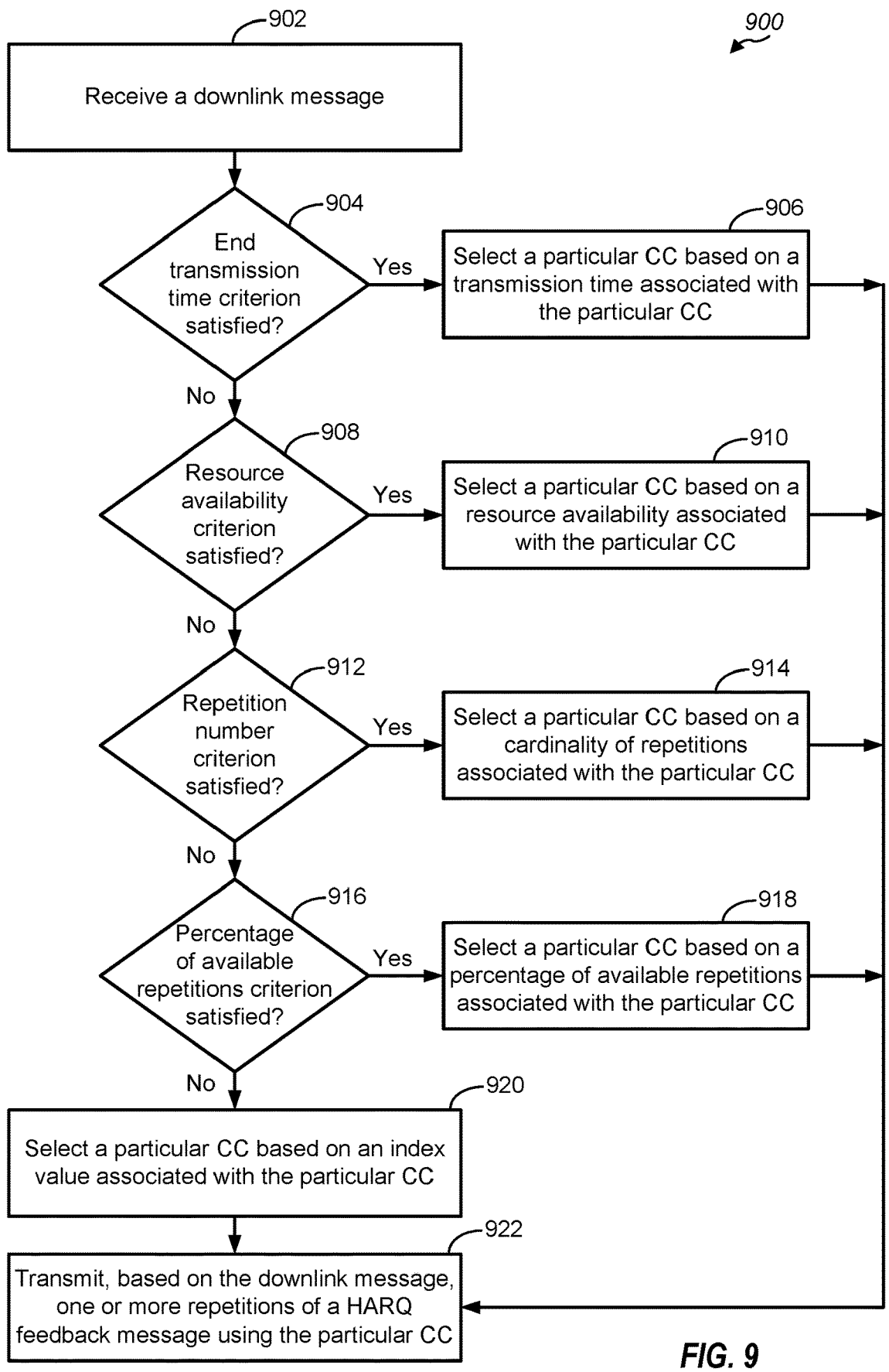
FIG. 9 is a flow chart illustrating an example of a method according to some aspects of the disclosure.

In some aspects of the disclosure, the one or more CC selection criteria 330 include multiple criteria, and the priority scheme 336 indicates priorities associated with the multiple criteria. FIG. 9 illustrates one illustrative example of the priority scheme 336.

FIG. 9 is a flow chart illustrating an example of a method 900 according to some aspects of the disclosure. The method 900 may be performed by the UE 115 based on the priority scheme 336. In a non-limiting example, the priority scheme 336 may indicate that the end transmission time criterion 331 is of a greater priority than the resource availability criterion 332, the repetition number criterion 333, the percentage of available repetitions criterion 334, and the CC index value criterion 335. The priority scheme 336 may further indicate that the resource availability criterion 332 is of a greater priority that the repetition number criterion 333, the percentage of available repetitions criterion 334, and the CC index value criterion 335. The priority scheme 336 may further indicate that the repetition number criterion 333 is of a greater priority than the percentage of available repetitions criterion 334 and the CC index value criterion 335 and that the percentage of available repetitions criterion 334 is of a greater priority than the CC index value criterion 335. Other examples are also within the scope of the disclosure, such as a different prioritization of criteria. Further, the base station 105 may modify the priority order indicated by the priority scheme 336, such as by transmitting one or more configuration messages to the UE 115.

The method 900 may include receiving a downlink message, at 902. For example, the UE 115 may receive the downlink message 340 from the base station 105.

The method 900 may further include determining, based on receiving the downlink message, whether the end transmission time criterion 331 is satisfied, at 904. The method 900 may further include selecting (e.g., in accordance with the example of FIG. 4) a particular CC (such as the first CC 324 or the second CC 326) based on an end transmission time associated with particular CC, at 906.

In some cases, the CCs 324, 326 may be associated with a common end transmission time. The method 900 may further include determining whether the resource availability criterion 332 is satisfied, at 908. The method 900 may further include selecting (e.g., in accordance with the example of FIG. 5) the particular CC based on a resource availability associated with the particular CC, at 910.

In some cases, the CCs 324, 326 may be associated with a common resource availability. The method 900 may include determining whether the repetition number criterion 333 is satisfied, at 912. The method 900 may further include selecting (e.g., in accordance with the example of FIG. 6) the particular CC based on a cardinality of repetitions associated with the particular CC, at 914.

In some cases, the CCs 324, 326 may be associated with a common cardinality of repetitions. The method 900 may include determining whether the percentage of available repetitions criterion 334 is satisfied, at 916. The method 900 may further include selecting (e.g., in accordance with the example of FIG. 7) the particular CC based on a percentage of available repetitions associated with the particular CC, at 918.

In some cases, the CCs 324, 326 may be associated with a common percentage of available repetitions. The method 900 may include selecting (e.g., in accordance with the example of FIG. 8) the particular CC based on an index value associated with the particular CC, at 920. The method 900 may further include transmitting, based on the downlink message, one or more repetitions of a HARQ feedback message using the particular CC, at 922. For example, the UE 115 may transmit the one or more repetitions 352 of the HARQ feedback message 350 using the first CC 324 or the second CC 326.

One or more aspects herein may improve performance of a wireless communication system. As an illustrative example, the one or more CC selection criteria 330 may specify that the UE 115 is to select the particular CC having the fewest number (or cardinality) of repetitions among the CCs 322 (which may imply that the particular CC is associated with a greater reliability in some cases). As another illustrative example, the one or more CC selection criteria 330 may specify that the UE 115 is to select the particular CC based on an index value associated with the particular CC, such as by selecting the CC having the lowest (or greatest) index value. In some examples, a lower (or greater) index value may indicate a lower frequency, which may be associated with increased reliability in some wireless communication protocols.

As another example, by using the one or more CC selection criteria 330, the base station 105 may avoid transmitting explicit indications of selected CCs to the UE 115. As a result, the UE 115 may dynamically select a particular CC based on the one or more CC selection criteria 330, which may reduce an amount of signaling overhead used to explicitly indicate a selected CC to the UE 115. By reducing the amount of signaling overhead, an amount of resources available for other operations may be increased. For example, instead of using resources to explicitly indicate a selected CC to the UE 115, the resources may instead be used to increase bandwidth of one or more other communications, which may improve performance of the wireless communication system 300.

To further illustrate certain aspects of the disclosure, in some implementations, use of the one or more CC selection criteria 330 may be conditioned on one or more events. For example, use of the one or more CC selection criteria 330 may be conditioned on failure to receive a DCI from the base station 105 indicating a selected CC. In such examples, the UE 115 may "default" to use of the one or more CC selection criteria 330. As another example, use of the one or more CC selection criteria 330 may be conditioned on receiving a DCI that does not explicitly identify a selected CC.

In some examples, a selected CC may be used for each repetition of a group of repetitions (e.g., where the group of repetitions occurs during a single cycle, and where each repetition of the group is transmitted using a single CC during the cycle). In some other examples, the UE 115 may be enabled to switch CCs from one repetition of a group to another repetition of a group (e.g., so that multiple CCs are used for repetitions within a single cycle). For example, the UE 115 may switch CCs during a cycle based on resource cancelation (resulting in an unavailable repetition), based on a change in channel quality, or based on an indication received from the base station 105 (such as a DCI indicating a selected CC). In some examples, one or more aspects described herein may be specified using RRC signaling by the base station 105 to the UE 115 (such as by indicating whether CC switching within a cycle is enabled or disabled, as an illustrative example).

FIG. 10 is a flow chart illustrating an example of a method 1000 of wireless communication by a UE according to some aspects of the disclosure. In some examples, the method 1000 is performed by the UE 115.

The method 1000 includes receiving one or more configuration messages indicating a plurality of CCs and one or more CC selection criteria associated with the plurality of CCs, at 1002. For example, the receiver 358 may be configured to receive the one or more configuration messages 320 from the base station 105. The one or more configuration messages 320 may indicate the CCs 322 and the one or more CC selection criteria 330.

The method 1000 further includes receiving a downlink message, at 1004. For example, the receiver 358 may be configured to receive the downlink message 340 from the base station 105.

The method 1000 further includes transmitting, based on the downlink message, one or more repetitions of a HARQ feedback message using a particular CC of the plurality of CCs, at 1006. The particular CC is selected by the UE from the plurality of CCs based on the one or more CC selection criteria. For example, the processor 280 may be configured to select the particular CC (such as the first CC 324 or the second CC 326) from the CCs 322 based on the one or more CC selection criteria 330, and the transmitter 356 may be configured to transmit the one or more repetitions 352 of the HARQ feedback message 350 using the particular CC.

FIG. 11 is a flow chart illustrating an example of a method 1100 of wireless communication by a base station according to some aspects of the disclosure. In some examples, the method 1100 is performed by the base station 105.

The method 1100 includes transmitting one or more configuration messages indicating a plurality of CCs and one or more CC selection criteria associated with the plurality of CCs, at 1102. For example, transmitter 306 may be configured to transmit the one or more configuration messages 320 to the UE 115. The one or more configuration messages 320 may indicate the CCs 322 and the one or more CC selection criteria 330.

The method 1100 further includes transmitting a downlink message, at 1104. For example, the transmitter 306 may be configured to transmit the downlink message 340 to the UE 115.

The method 1100 further includes receiving, based on the downlink message, one or more repetitions of a HARQ feedback message using a particular CC of the plurality of CCs, at 1106. The particular CC is selected from the plurality of CCs based on the one or more CC selection criteria. For example, the receiver 308 may be configured to receive the one or more repetitions 352 of the HARQ feedback message 350 using the particular CC selected by the UE 115 based on the one or more CC selection criteria 330.

Figure 12:
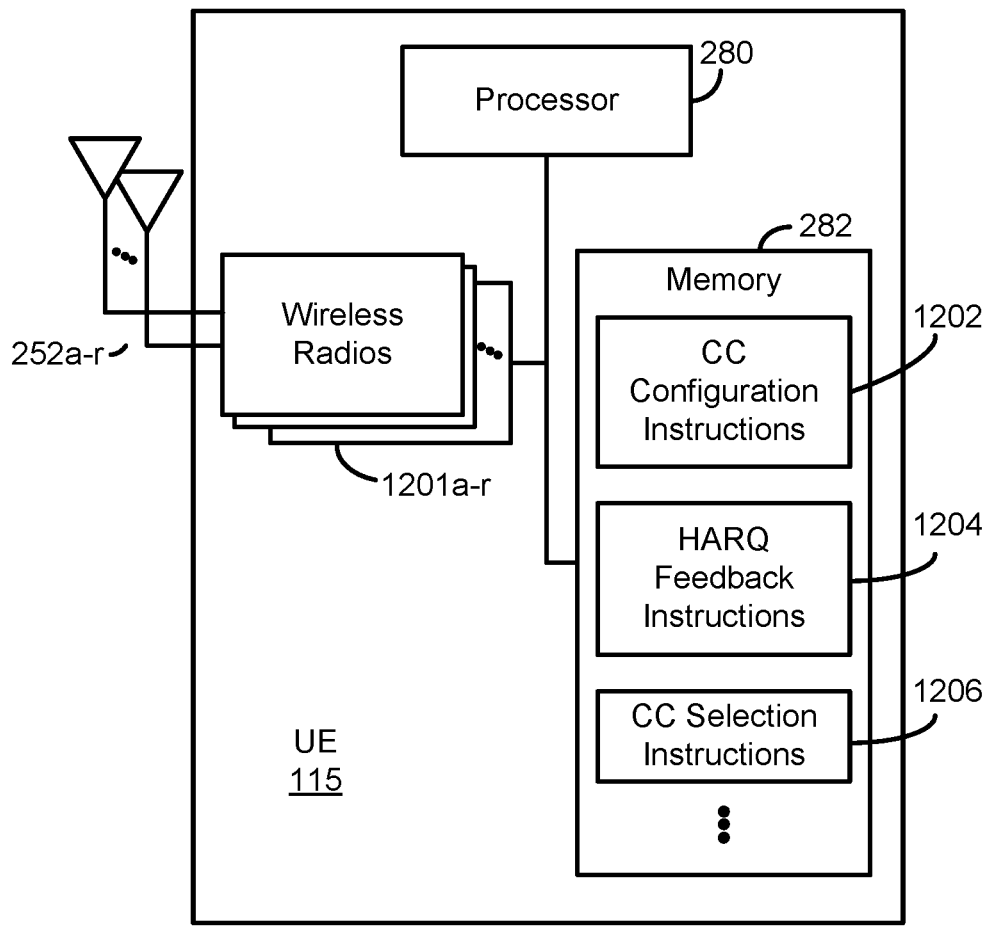
FIG. 12 is a block diagram of an example of a UE according to some aspects of the disclosure.

FIG. 12 is a block diagram illustrating an example UE 115. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 1201$a$-$r$ and antennas 252$a$-$r$. The wireless radios 1201$a$-$r$ may include one or more components or devices described herein, such as the modulator/demodulators 254$a$-$r$, the MIMO detector 256, the receive processor 258, the transmit processor 264, the TX MIMO processor 266, the transmitter 356, and the receiver 358, one or more other components or devices, or a combination thereof.

The memory 282 may store instructions executable by the processor 280 to initiate, control, or perform one or more operations described herein. For example, the memory 282 may store CC configuration instructions 1202 executable by the processor 280 to receive the one or more configuration messages 320 from the base station 105 and to identify the CCs 322 and the one or more CC selection criteria 330 based on the one or more configuration messages 320. As another example, the memory 282 may store HARQ feedback instructions 1204 executable by the processor 280 to receive the downlink message 340 and to generate the HARQ feedback message 350 based on the downlink message 340. As an additional example, the memory 282 may store CC selection instructions 1206 executable by the processor 280 to select a particular CC from the CCs 322 using one or more techniques described herein and to transmit the one or more repetitions 352 of the HARQ feedback message 350 based on the particular CC.

Figure 13:
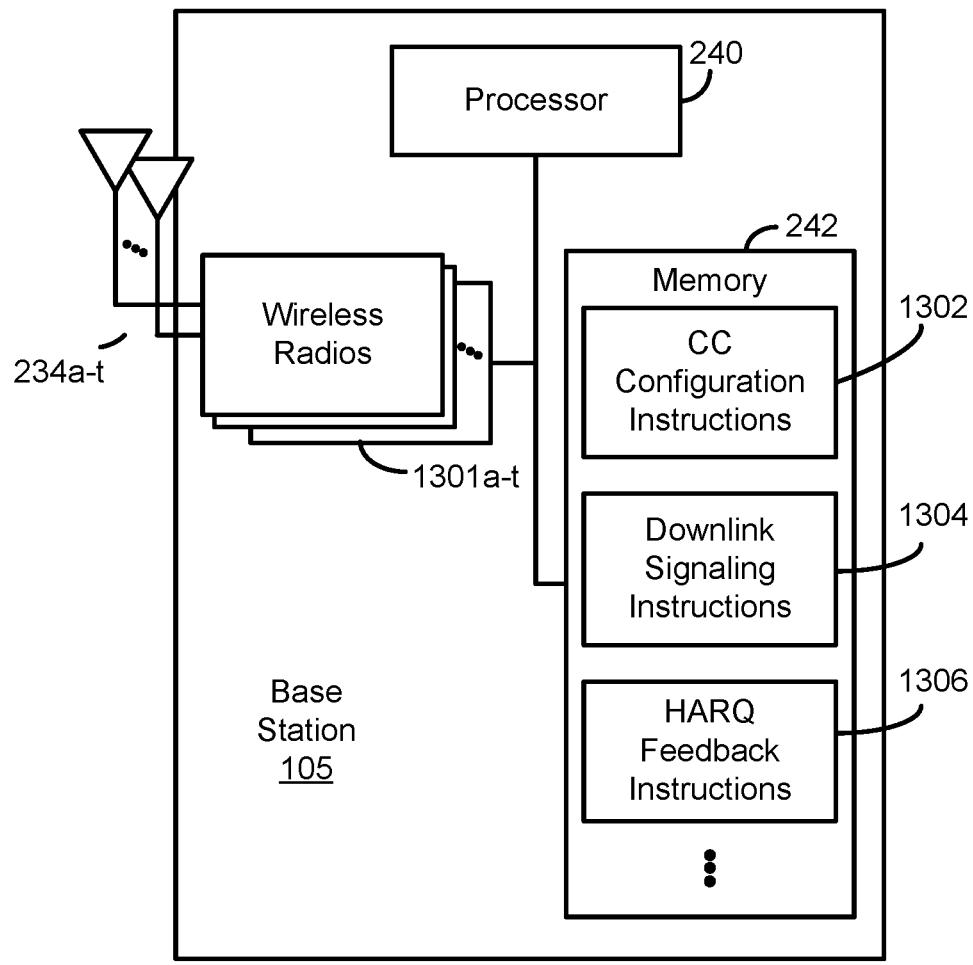
FIG. 13 is a block diagram of an example of a base station according to some aspects of the disclosure.

FIG. 13 is a block diagram illustrating an example base station. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 1301$a$-$t$ and antennas 234$a$-$t$. The wireless radios 1301$a$-$t$ may include one or more components or devices described herein, such as the modulator/demodulators 232$a$-$t$, the MIMO detector 236, the receive processor 238, the transmit processor 220, the TX MIMO processor 230, the transmitter 306, and receiver 308, one or more other components or devices, or a combination thereof.

The memory 242 may store instructions executable by the processor 240 to perform one or more operations described herein. For example, the memory 242 may store CC configuration instructions 1302 executable by the processor 240 to transmit the one or more configuration messages 320 to indicate the CCs 322 and the one or more CC selection criteria 330 to the UE 115. As another example, the memory 242 may store downlink signaling instructions 1304 executable by the processor 240 to transmit the downlink message 340 to the UE 115. As an additional example, the memory 242 may store HARQ feedback instructions 1306 executable by the processor 240 to receive the one or more repetitions 352 of the HARQ feedback message 350 based on the particular CC selected by the UE 115 using the one or more CC selection criteria 330.

To further illustrate some aspects of the disclosure, in a first aspect, a method of wireless communication by a user equipment (UE) includes receiving one or more configuration messages indicating a plurality of component carriers (CCs) and one or more CC selection criteria associated with the plurality of CCs. The method further includes receiving a downlink message and transmitting, based on the downlink message, one or more repetitions of a hybrid automatic repeat request (HARQ) feedback message using a particular CC of the plurality of CCs. The particular CC is selected by the UE from the plurality of CCs based on the one or more CC selection criteria.

In a second aspect, alone or in combination with the first aspect, the downlink message does not include an indication of the particular CC based on a difference in channel quality between the plurality of CCs being less than a threshold difference, and indicating the one or more CC selection criteria enables the UE to perform carrier switching among the plurality of CCs without the indication of the particular CC.

In a third aspect, alone or in combination with one or more of the first aspect or the second aspect, the one or more CC selection criteria include an end transmission time criterion.

In a fourth aspect, alone or in combination with one or more of the first aspect through the third aspect, the method includes: determining that the end transmission time associated with the one or more repetitions is to occur sooner than end transmission times of one or more other repetitions transmitted via other CCs of the plurality of CCs; and based on determining that the end transmission time associated with the one or more repetitions is to occur sooner than the end transmission times of the one or more other repetitions, determining that the end transmission time associated with the one or more repetitions satisfies the end transmission time criterion.

In a fifth aspect, alone or in combination with one or more of the first aspect through the fourth aspect, the one or more CC selection criteria include a resource availability criterion.

In a sixth aspect, alone or in combination with one or more of the first aspect through the fifth aspect, the method includes: receiving a control message indicating that resources associated with at least one repetition of another CC of the plurality of CCs are unavailable to the UE; and based on the control message indicating that the resources are unavailable, determining that a resource availability associated with the particular CC satisfies the resource availability criterion.

In a seventh aspect, alone or in combination with one or more of the first aspect through the sixth aspect, the one or more CC selection criteria include a repetition number criterion.

In an eighth aspect, alone or in combination with one or more of the first aspect through the seventh aspect, the method includes determining that a cardinality of the one or more repetitions associated with the particular CC is less than cardinalities of other sets of repetitions associated with other CCs of the plurality of CCs; and based on the cardinality of the one or more repetitions associated with the particular CC being less than the cardinalities of the other sets of repetitions, determining that the cardinality of the one or more repetitions associated with the particular CC satisfies the repetition number criterion.

In a ninth aspect, alone or in combination with one or more of the first aspect through the eighth aspect, the one or more CC selection criteria include a percentage of available repetitions criterion.

In a tenth aspect, alone or in combination with one or more of the first aspect through the ninth aspect, the method includes receiving a control message indicating that resources associated with at least one repetition of another CC of the plurality of CCs are unavailable to the UE; and based on the control message indicating that the resources are unavailable, determining that a percentage of available repetitions associated with the one or more repetitions of the HARQ feedback message satisfies the percentage of available repetitions criterion.

In an eleventh aspect, alone or in combination with one or more of the first aspect through the tenth aspect, the one or more CC selection criteria include a CC index value criterion.

In a twelfth aspect, alone or in combination with one or more of the first aspect through the eleventh aspect, the method includes: determining that an index value associated with the particular CC is less than other index values associated with other CCs of the plurality of CCs; and based on the index value associated with the particular CC being less than the other index values associated with the other CCs, determining that the index value satisfies the CC index value criterion.

In a thirteenth aspect, alone or in combination with one or more of the first aspect through the twelfth aspect, the one or more CC selection criteria include an end transmission time criterion, a resource availability criterion, a repetition number criterion, a percentage of available repetitions criterion, and a CC index value criterion, and the one or more configuration messages further indicate a priority scheme associated with the one or more CC selection criteria.

In a fourteenth aspect, alone or in combination with one or more of the first aspect through the thirteenth aspect, the priority scheme indicates that the end transmission time criterion is of a greater priority than the resource availability criterion, the repetition number criterion, the percentage of available repetitions criterion, and the CC index value criterion, and the method includes, based on receiving the downlink message, determining whether the end transmission time criterion is satisfied.

In a fifteenth aspect, alone or in combination with one or more of the first aspect through the fourteenth aspect, the particular CC is selected based on determining that an end transmission time associated with the one or more repetitions satisfies the end transmission time criterion.

In a sixteenth aspect, alone or in combination with one or more of the first aspect through the fifteenth aspect, the plurality of CCs are associated with a common end transmission time, the priority scheme indicates that the resource availability criterion is of a greater priority than the repetition number criterion, the percentage of available repetitions criterion, and the CC index value criterion, and the method includes determining whether the resource availability criterion is satisfied.

In a seventeenth aspect, alone or in combination with one or more of the first aspect through the sixteenth aspect, the particular CC is selected based on determining that a resource availability associated with the particular CC satisfies the resource availability criterion.

In an eighteenth aspect, alone or in combination with one or more of the first aspect through the seventeenth aspect, the plurality of CCs are associated with a common resource availability, the priority scheme indicates that the repetition number criterion is of a greater priority than the percentage of available repetitions criterion and the CC index value criterion, and the method includes determining whether the repetition number criterion is satisfied.

In a nineteenth aspect, alone or in combination with one or more of the first aspect through the eighteenth aspect, the particular CC is selected based on determining that a cardinality of the one or more repetitions satisfies the repetition number criterion.

In a twentieth aspect, alone or in combination with one or more of the first aspect through the nineteenth aspect, the plurality of CCs are associated with a common cardinality of repetitions, the priority scheme indicates that the percentage of available repetitions criterion is of a greater priority than the CC index value criterion, and the method includes determining whether the percentage of available repetitions criterion is satisfied.

In a twenty-first aspect, alone or in combination with one or more of the first aspect through the twentieth aspect, the particular CC is selected based on determining that a percentage of available repetitions associated with the one or more repetitions of the HARQ feedback message satisfies the percentage of available repetitions criterion.

In a twenty-second aspect, alone or in combination with one or more of the first aspect through the twenty-first aspect, the plurality of CCs are associated with a common percentage of available repetitions, and the particular CC is selected based on the CC index value criterion.

In a twenty-third aspect, alone or in combination with one or more of the first aspect through the twenty-second aspect, an apparatus includes a receiver configured to receive one or more configuration messages indicating a plurality of component carriers (CCs) and one or more CC selection criteria associated with the plurality of CCs. The receiver is further configured to receive a downlink message. The apparatus further includes a transmitter configured to transmit, based on the downlink message, one or more repetitions of a hybrid automatic repeat request (HARQ) feedback message using a particular CC of the plurality of CCs. The particular CC is selected from the plurality of CCs based on the one or more CC selection criteria.

In a twenty-fourth aspect, alone or in combination with one or more of the first aspect through the twenty-third aspect, the downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a twenty-fifth aspect, alone or in combination with one or more of the first aspect through the twenty-fourth aspect, the one or more CC selection criteria include an end transmission time criterion.

In a twenty-sixth aspect, alone or in combination with one or more of the first aspect through the twenty-fifth aspect, the apparatus includes a processor configured to: determine that the end transmission time associated with the one or more repetitions is to occur sooner than end transmission times of one or more other repetitions transmitted via other CCs of the plurality of CCs; and based on determining that the end transmission time associated with the one or more repetitions is to occur sooner than the end transmission times of the one or more other repetitions, determine that the end transmission time associated with the one or more repetitions satisfies the end transmission time criterion.

In a twenty-seventh aspect, alone or in combination with one or more of the first aspect through the twenty-sixth aspect, the one or more CC selection criteria include a resource availability criterion.

In a twenty-eighth aspect, alone or in combination with one or more of the first aspect through the twenty-seventh aspect, the receiver is further configured to receive a control message indicating that resources associated with at least one repetition of another CC of the plurality of CCs are unavailable, and the apparatus includes a processor configured to determine, based on the control message indicating that the resources are unavailable, that a resource availability associated with the particular CC satisfies the resource availability criterion.

In a twenty-ninth aspect, alone or in combination with one or more of the first aspect through the twenty-eighth aspect, the one or more CC selection criteria include a repetition number criterion.

In a thirtieth aspect, alone or in combination with one or more of the first aspect through the twenty-ninth aspect, the apparatus includes a processor configured to: determine that a cardinality of the one or more repetitions associated with the particular CC is less than cardinalities of other sets of repetitions associated with other CCs of the plurality of CCs; and based on the cardinality of the one or more repetitions associated with the particular CC being less than the cardinalities of the other sets of repetitions, determine that the cardinality of the one or more repetitions associated with the particular CC satisfies the repetition number criterion.

In a thirty-first aspect, alone or in combination with one or more of the first aspect through the thirtieth aspect, the one or more CC selection criteria include a percentage of available repetitions criterion.

In a thirty-second aspect, alone or in combination with one or more of the first aspect through the thirty-first aspect, the receiver is further configured to receive a control message indicating that resources associated with at least one repetition of another CC of the plurality of CCs are unavailable, and the apparatus includes a processor configured to determine, based on the control message indicating that the resources are unavailable, that a percentage of available repetitions associated with the one or more repetitions of the HARQ feedback message satisfies the percentage of available repetitions criterion.

In a thirty-third aspect, alone or in combination with one or more of the first aspect through the thirty-second aspect, the one or more CC selection criteria include a CC index value criterion.

In a thirty-fourth aspect, alone or in combination with one or more of the first aspect through the thirty-fourth aspect, the apparatus includes a processor configured to: determine that an index value associated with the particular CC is less than other index values associated with other CCs of the plurality of CCs; and based on the index value associated with the particular CC being less than the other index values associated with the other CCs, determine that the index value satisfies the CC index value criterion.

In a thirty-fifth aspect, alone or in combination with one or more of the first aspect through the thirty-third aspect, the one or more CC selection criteria include an end transmission time criterion, a resource availability criterion, a repetition number criterion, a percentage of available repetitions criterion, and a CC index value criterion, and the one or more configuration messages further indicate a priority scheme associated with the one or more CC selection criteria.

In a thirty-sixth aspect, alone or in combination with one or more of the first aspect through the thirty-fifth aspect, the priority scheme indicates that the end transmission time criterion is of a greater priority than the resource availability criterion, the repetition number criterion, the percentage of available repetitions criterion, and the CC index value criterion.

In a thirty-seventh aspect, alone or in combination with one or more of the first aspect through the thirty-sixth aspect, the particular CC is selected based on determining that an end transmission time associated with the one or more repetitions satisfies the end transmission time criterion.

In a thirty-eighth aspect, alone or in combination with one or more of the first aspect through the thirty-seventh aspect, the plurality of CCs are associated with a common end transmission time, and the priority scheme indicates that the resource availability criterion is of a greater priority than the repetition number criterion, the percentage of available repetitions criterion, and the CC index value criterion.

In a thirty-ninth aspect, alone or in combination with one or more of the first aspect through the thirty-eighth aspect, the particular CC is selected based on determining that a resource availability associated with the particular CC satisfies the resource availability criterion.

In a fortieth aspect, alone or in combination with one or more of the first aspect through the thirty-ninth aspect, the plurality of CCs are associated with a common resource availability, and the priority scheme indicates that the repetition number criterion is of a greater priority than the percentage of available repetitions criterion and the CC index value criterion.

In a forty-first aspect, alone or in combination with one or more of the first aspect through the fortieth aspect, the particular CC is selected based on determining that a cardinality of the one or more repetitions satisfies the repetition number criterion.

In a forty-second aspect, alone or in combination with one or more of the first aspect through the forty-first aspect, the plurality of CCs are associated with a common cardinality of repetitions, and the priority scheme indicates that the percentage of available repetitions criterion is of a greater priority than the CC index value criterion.

In a forty-third aspect, alone or in combination with one or more of the first aspect through the forty-second aspect, the particular CC is selected based on determining that a percentage of available repetitions associated with the one or more repetitions of the HARQ feedback message satisfies the percentage of available repetitions criterion.

In a forty-fourth aspect, alone or in combination with one or more of the first aspect through the forty-third aspect, the plurality of CCs are associated with a common percentage of available repetitions, and the particular CC is selected based on the CC index value criterion.

In a forty-fifth aspect, alone or in combination with one or more of the first aspect through the forty-fourth aspect, a non-transitory computer-readable medium stores instructions executable by a processor to initiate, perform, or control operations. The operations include receiving one or more configuration messages indicating a plurality of component carriers (CCs) and one or more CC selection criteria associated with the plurality of CCs. The operations further include receiving a downlink message and transmitting, based on the downlink message, one or more repetitions of a hybrid automatic repeat request (HARQ) feedback message using a particular CC of the plurality of CCs. The particular CC is selected from the plurality of CCs based on the one or more CC selection criteria.

In a forty-sixth aspect, alone or in combination with one or more of the first aspect through the forty-fifth aspect, the downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a forty-seventh aspect, alone or in combination with one or more of the first aspect through the forty-sixth aspect, the one or more CC selection criteria include an end transmission time criterion.

In a forty-eighth aspect, alone or in combination with one or more of the first aspect through the forty-seventh aspect, the operations include: determining that the end transmission time associated with the one or more repetitions is to occur sooner than end transmission times of one or more other repetitions transmitted via other CCs of the plurality of CCs; and based on determining that the end transmission time associated with the one or more repetitions is to occur sooner than the end transmission times of the one or more other repetitions, determining that the end transmission time associated with the one or more repetitions satisfies the end transmission time criterion.

In a forty-ninth aspect, alone or in combination with one or more of the first aspect through the forty-eighth aspect, the one or more CC selection criteria include a resource availability criterion.

In a fiftieth aspect, alone or in combination with one or more of the first aspect through the forty-ninth aspect, the operations include: receiving a control message indicating that resources associated with at least one repetition of another CC of the plurality of CCs are unavailable; and based on the control message indicating that the resources are unavailable, determining that a resource availability associated with the particular CC satisfies the resource availability criterion.

In a fifty-first aspect, alone or in combination with one or more of the first aspect through the fiftieth aspect, the one or more CC selection criteria include a repetition number criterion.

In a fifty-second aspect, alone or in combination with one or more of the first aspect through the fifty-first aspect, the operations include: determining that a cardinality of the one or more repetitions associated with the particular CC is less than cardinalities of other sets of repetitions associated with other CCs of the plurality of CCs; and based on the cardinality of the one or more repetitions associated with the particular CC being less than the cardinalities of the other sets of repetitions, determining that the cardinality of the one or more repetitions associated with the particular CC satisfies the repetition number criterion.

In a fifty-third aspect, alone or in combination with one or more of the first aspect through the fifty-second aspect, the one or more CC selection criteria include a percentage of available repetitions criterion.

In a fifty-fourth aspect, alone or in combination with one or more of the first aspect through the fifty-third aspect, the operations further include: receiving a control message indicating that resources associated with at least one repetition of another CC of the plurality of CCs are unavailable;

and based on the control message indicating that the resources are unavailable, determining that a percentage of available repetitions associated with the one or more repetitions of the HARQ feedback message satisfies the percentage of available repetitions criterion.

In a fifty-fifth aspect, alone or in combination with one or more of the first aspect through the fifty-fourth aspect, the one or more CC selection criteria include a CC index value criterion.

In a fifty-sixth aspect, alone or in combination with one or more of the first aspect through the fifty-fifth aspect, the operations further include: determining that an index value associated with the particular CC is less than other index values associated with other CCs of the plurality of CCs; and based on the index value associated with the particular CC being less than the other index values associated with the other CCs, determining that the index value satisfies the CC index value criterion.

In a fifty-seventh aspect, alone or in combination with one or more of the first aspect through the fifty-sixth aspect, the one or more CC selection criteria include an end transmission time criterion, a resource availability criterion, a repetition number criterion, a percentage of available repetitions criterion, and a CC index value criterion, and the one or more configuration messages further indicate a priority scheme associated with the one or more CC selection criteria.

In a fifty-eighth aspect, alone or in combination with one or more of the first aspect through the fifty-seventh aspect, the priority scheme indicates that the end transmission time criterion is of a greater priority than the resource availability criterion, the repetition number criterion, the percentage of available repetitions criterion, and the CC index value criterion, and the operations further include, based on receiving the downlink message, determining whether the end transmission time criterion is satisfied.

In a fifty-ninth aspect, alone or in combination with one or more of the first aspect through the fifty-eighth aspect, the particular CC is selected based on determining that an end transmission time associated with the one or more repetitions satisfies the end transmission time criterion.

In a sixtieth aspect, alone or in combination with one or more of the first aspect through the fifty-ninth aspect, the plurality of CCs are associated with a common end transmission time, the priority scheme indicates that the resource availability criterion is of a greater priority than the repetition number criterion, the percentage of available repetitions criterion, and the CC index value criterion, and the operations further include determining whether the resource availability criterion is satisfied.

In a sixty-first aspect, alone or in combination with one or more of the first aspect through the sixtieth aspect, the particular CC is selected based on determining that a resource availability associated with the particular CC satisfies the resource availability criterion.

In a sixty-second aspect, alone or in combination with one or more of the first aspect through the sixty-first aspect, the plurality of CCs are associated with a common resource availability, the priority scheme indicates that the repetition number criterion is of a greater priority than the percentage of available repetitions criterion and the CC index value criterion, and the operations further include determining whether the repetition number criterion is satisfied.

In a sixty-third aspect, alone or in combination with one or more of the first aspect through the sixty-second aspect, the particular CC is selected based on determining that a cardinality of the one or more repetitions satisfies the repetition number criterion.

In a sixty-fourth aspect, alone or in combination with one or more of the first aspect through the sixty-third aspect, the plurality of CCs are associated with a common cardinality of repetitions, the priority scheme indicates that the percentage of available repetitions criterion is of a greater priority than the CC index value criterion, and the operations further include determining whether the percentage of available repetitions criterion is satisfied.

In a sixty-fifth aspect, alone or in combination with one or more of the first aspect through the sixty-fourth aspect, the particular CC is selected based on determining that a percentage of available repetitions associated with the one or more repetitions of the HARQ feedback message satisfies the percentage of available repetitions criterion.

In a sixty-sixth aspect, alone or in combination with one or more of the first aspect through the sixty-fifth aspect, the plurality of CCs are associated with a common percentage of available repetitions, and the particular CC is selected based on the CC index value criterion.

In a sixty-seventh aspect, alone or in combination with one or more of the first aspect through the sixty-sixth aspect, an apparatus includes means for receiving one or more configuration messages indicating a plurality of component carriers (CCs) and one or more CC selection criteria associated with the plurality of CCs and for receiving a downlink message. The apparatus further includes means for transmitting, based on the downlink message, one or more repetitions of a hybrid automatic repeat request (HARQ) feedback message using a particular CC of the plurality of CCs. The particular CC is selected from the plurality of CCs based on the one or more CC selection criteria.

In a sixty-eighth aspect, alone or in combination with one or more of the first aspect through the sixty-seventh aspect, the downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a sixty-ninth aspect, alone or in combination with one or more of the first aspect through the sixty-eighth aspect, the one or more CC selection criteria include an end transmission time criterion.

In a seventieth aspect, alone or in combination with one or more of the first aspect through the sixty-ninth aspect, the apparatus includes means for: determining that the end transmission time associated with the one or more repetitions is to occur sooner than end transmission times of one or more other repetitions transmitted via other CCs of the plurality of CCs; and based on determining that the end transmission time associated with the one or more repetitions is to occur sooner than the end transmission times of the one or more other repetitions, determining that the end transmission time associated with the one or more repetitions satisfies the end transmission time criterion.

In a seventy-first aspect, alone or in combination with one or more of the first aspect through the seventieth aspect, the one or more CC selection criteria include a resource availability criterion.

In a seventy-second aspect, alone or in combination with one or more of the first aspect through the seventy-first aspect, the means for receiving is configured to receive a control message indicating that resources associated with at least one repetition of another CC of the plurality of CCs are unavailable, and the apparatus includes means for determining, based on the control message indicating that the resources are unavailable, that a resource availability associated with the particular CC satisfies the resource availability criterion.

In a seventy-third aspect, alone or in combination with one or more of the first aspect through the seventy-second aspect, the one or more CC selection criteria include a repetition number criterion.

In a seventy-fourth aspect, alone or in combination with one or more of the first aspect through the seventy-third aspect, the apparatus includes means for: determining that a cardinality of the one or more repetitions associated with the particular CC is less than cardinalities of other sets of repetitions associated with other CCs of the plurality of CCs; and based on the cardinality of the one or more repetitions associated with the particular CC being less than the cardinalities of the other sets of repetitions, determining that the cardinality of the one or more repetitions associated with the particular CC satisfies the repetition number criterion.

In a seventy-fifth aspect, alone or in combination with one or more of the first aspect through the seventy-fourth aspect, the one or more CC selection criteria include a percentage of available repetitions criterion.

In a seventy-sixth aspect, alone or in combination with one or more of the first aspect through the seventy-fifth aspect, the means for receiving is configured to receive a control message indicating that resources associated with at least one repetition of another CC of the plurality of CCs are unavailable, and the apparatus includes means for determining, based on the control message indicating that the resources are unavailable, that a percentage of available repetitions associated with the one or more repetitions of the HARQ feedback message satisfies the percentage of available repetitions criterion.

In a seventy-seventh aspect, alone or in combination with one or more of the first aspect through the seventy-sixth aspect, the one or more CC selection criteria include a CC index value criterion.

In a seventy-eighth aspect, alone or in combination with one or more of the first aspect through the seventy-seventh aspect, the apparatus includes means for: determining that an index value associated with the particular CC is less than other index values associated with other CCs of the plurality of CCs; and based on the index value associated with the particular CC being less than the other index values associated with the other CCs, determining that the index value satisfies the CC index value criterion.

In a seventy-ninth aspect, alone or in combination with one or more of the first aspect through the seventy-eighth aspect, the one or more CC selection criteria include an end transmission time criterion, a resource availability criterion, a repetition number criterion, a percentage of available repetitions criterion, and a CC index value criterion, and the one or more configuration messages further indicate a priority scheme associated with the one or more CC selection criteria.

In a eightieth aspect, alone or in combination with one or more of the first aspect through the seventy-ninth aspect, the priority scheme indicates that the end transmission time criterion is of a greater priority than the resource availability criterion, the repetition number criterion, the percentage of available repetitions criterion, and the CC index value criterion.

In a eighty-first aspect, alone or in combination with one or more of the first aspect through the eightieth aspect, the particular CC is selected based on determining that an end transmission time associated with the one or more repetitions satisfies the end transmission time criterion.

In a eighty-second aspect, alone or in combination with one or more of the first aspect through the eighty-first aspect, the plurality of CCs are associated with a common end transmission time, and the priority scheme indicates that the resource availability criterion is of a greater priority than the repetition number criterion, the percentage of available repetitions criterion, and the CC index value criterion.

In a eighty-third aspect, alone or in combination with one or more of the first aspect through the eighty-second aspect, the particular CC is selected based on determining that a resource availability associated with the particular CC satisfies the resource availability criterion.

In a eighty-fourth aspect, alone or in combination with one or more of the first aspect through the eighty-third aspect, the plurality of CCs are associated with a common resource availability, the priority scheme indicates that the repetition number criterion is of a greater priority than the percentage of available repetitions criterion and the CC index value criterion.

In a eighty-fifth aspect, alone or in combination with one or more of the first aspect through the eighty-fourth aspect, the particular CC is selected based on determining that a cardinality of the one or more repetitions satisfies the repetition number criterion.

In a eighty-sixth aspect, alone or in combination with one or more of the first aspect through the eighty-fifth aspect, the plurality of CCs are associated with a common cardinality of repetitions, the priority scheme indicates that the percentage of available repetitions criterion is of a greater priority than the CC index value criterion.

In a eighty-seventh aspect, alone or in combination with one or more of the first aspect through the eighty-sixth aspect, the particular CC is selected based on determining that a percentage of available repetitions associated with the one or more repetitions of the HARQ feedback message satisfies the percentage of available repetitions criterion.

In a eighty-eighth aspect, alone or in combination with one or more of the first aspect through the eighty-seventh aspect, the plurality of CCs are associated with a common percentage of available repetitions, and the particular CC is selected based on the CC index value criterion.

In a eighty-ninth aspect, alone or in combination with one or more of the first through the eighty-eighth aspect, a method of wireless communication by a base station includes transmitting one or more configuration messages indicating a plurality of component carriers (CCs) and one or more CC selection criteria associated with the plurality of CCs. The method further includes transmitting a downlink message and receiving, based on the downlink message, one or more repetitions of a hybrid automatic repeat request (HARQ) feedback message using a particular CC of the plurality of CCs. The particular CC is selected from the plurality of CCs based on the one or more CC selection criteria.

In a ninetieth aspect, alone or in combination with one or more of the first aspect through the eighty-ninth aspect, the downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a ninety-first aspect, alone or in combination with one or more of the first aspect through the ninetieth aspect, the one or more CC selection criteria include one or more of an end transmission time criterion, a resource availability criterion, a repetition number criterion, a percentage of available repetitions criterion, or a CC index value criterion.

In a ninety-second aspect, alone or in combination with one or more of the first aspect through the ninety-first aspect, the one or more configuration messages further indicate a priority scheme associated with the one or more CC selection criteria.

In a ninety-third aspect, alone or in combination with one or more of the first aspect through the ninety-second aspect, an apparatus includes a transmitter configured to transmit one or more configuration messages indicating a plurality of component carriers (CCs) and one or more CC selection criteria associated with the plurality of CCs. The transmitter is further configured to transmit a downlink message. The apparatus further includes a receiver configured to receive, based on the downlink message, one or more repetitions of a hybrid automatic repeat request (HARQ) feedback message using a particular CC of the plurality of CCs. The particular CC is selected from the plurality of CCs based on the one or more CC selection criteria.

In a ninety-fourth aspect, alone or in combination with one or more of the first aspect through the ninety-third aspect, he downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a ninety-fifth aspect, alone or in combination with one or more of the first aspect through the ninety-fourth aspect, the one or more CC selection criteria include one or more of an end transmission time criterion, a resource availability criterion, a repetition number criterion, a percentage of available repetitions criterion, or a CC index value criterion.

In a ninety-sixth aspect, alone or in combination with one or more of the first aspect through the ninety-fifth aspect, the one or more configuration messages further indicate a priority scheme associated with the one or more CC selection criteria.

In a ninety-seventh aspect, alone or in combination with one or more of the first aspect through the ninety-sixth aspect, a non-transitory computer-readable medium stores instructions executable by a processor to initiate, perform, or control operations. The operations include transmitting one or more configuration messages indicating a plurality of component carriers (CCs) and one or more CC selection criteria associated with the plurality of CCs. The operations further include transmitting a downlink message and receiving, based on the downlink message, one or more repetitions of a hybrid automatic repeat request (HARQ) feedback message using a particular CC of the plurality of CCs. The particular CC is selected from the plurality of CCs based on the one or more CC selection criteria.

In a ninety-eighth aspect, alone or in combination with one or more of the first aspect through the ninety-seventh aspect, the downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a ninety-ninth aspect, alone or in combination with one or more of the first aspect through the ninety-eighth aspect, the one or more CC selection criteria include one or more of an end transmission time criterion, a resource availability criterion, a repetition number criterion, a percentage of available repetitions criterion, or a CC index value criterion.

In a one-hundredth aspect, alone or in combination with one or more of the first aspect through the ninety-ninth aspect, the one or more configuration messages further indicate a priority scheme associated with the one or more CC selection criteria.

In a one-hundredth-and-first aspect, alone or in combination with one or more of the first aspect through the one-hundredth aspect, an apparatus includes means for transmitting one or more configuration messages indicating a plurality of component carriers (CCs) and one or more CC selection criteria associated with the plurality of CCs and for transmitting a downlink message. The apparatus further includes means for receiving, based on the downlink message, one or more repetitions of a hybrid automatic repeat request (HARQ) feedback message using a particular CC of the plurality of CCs. The particular CC is selected from the plurality of CCs based on the one or more CC selection criteria.

In a one-hundredth-and-second aspect, alone or in combination with one or more of the first aspect through the one-hundredth-and-first aspect, the downlink message does not include an indication of the particular CC based on a difference in channel quality between the plurality of CCs being less than a threshold difference, and indicating the one or more CC selection criteria enables carrier switching among the plurality of CCs without the indication of the particular CC.

In a one-hundredth-and-third aspect, alone or in combination with one or more of the first aspect through the one-hundredth-and-second aspect, the one or more CC selection criteria include one or more of an end transmission time criterion, a resource availability criterion, a repetition number criterion, a percentage of available repetitions criterion, or a CC index value criterion.

In a one-hundredth-and-fourth aspect, alone or in combination with one or more of the first aspect through the one-hundredth-and-third aspect, the one or more configuration messages further indicate a priority scheme associated with the one or more CC selection criteria.

Those of skill in the art would understand that information and signals may be represented using any of a variety of different technologies and techniques. For example, data, instructions, commands, information, signals, bits, symbols, and chips that may be referenced above may be represented by voltages, currents, electromagnetic waves, magnetic fields or particles, optical fields or particles, or any combination thereof.

One or more functional blocks and components described herein may comprise processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

Those of skill would further appreciate that the various illustrative logical blocks, modules, circuits, and operations described herein may be implemented using electronic hardware, computer software, or combinations of both. To illustrate, various illustrative components, blocks, modules, circuits, and operations have been described above generally in terms of their functionality. Whether such functionality is implemented using hardware or software depends upon the particular application and design of the overall system. Skilled artisans may implement the described functionality in varying ways for each particular application, but such implementation decisions should not be interpreted as causing a departure from the scope of the disclosure. Skilled artisans will also recognize that the order or combination of components, operations, or interactions that are described herein are merely examples and that the components, operations, or interactions may be combined or performed in ways other than those illustrated and described herein.

The various illustrative logical blocks, modules, and circuits described herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be implemented using hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In some examples, the storage medium may be integral to the processor. The processor and the storage medium may reside in an ASIC. The ASIC may reside in a user terminal. In some other examples, the processor and the storage medium may reside as discrete components in a user terminal.

In one or more examples, the functions described herein may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication by a user equipment (UE), the method comprising:
   receiving one or more configuration messages indicating a plurality of component carriers (CCs) and one or more CC selection criteria associated with selecting among the plurality of CCs for a hybrid automatic repeat request (HARQ) feedback message, wherein the one or more CC selection criteria include one or more of an end transmission time criterion, a repetition number criterion, or a percentage of available repetitions criterion;
   receiving a downlink message; and
   transmitting, based on the downlink message, one or more repetitions of the HARQ feedback message using a particular CC of the plurality of CCs, wherein the particular CC is selected by the UE from the plurality of CCs based on the one or more CC selection criteria.

2. The method of claim 1, wherein the one or more CC selection criteria include an end transmission time criterion, and further including:
   determining that an end transmission time associated with the one or more repetitions is to occur sooner than end transmission times of one or more other repetitions transmitted via other CCs of the plurality of CCs; and
   based on determining that the end transmission time associated with the one or more repetitions is to occur sooner than the end transmission times of the one or more other repetitions, determining that the end transmission time associated with the one or more repetitions satisfies the end transmission time criterion.

3. The method of claim 1, wherein the one or more CC selection criteria include a resource availability criterion, and further including:
   receiving a control message indicating that resources associated with at least one repetition of another CC of the plurality of CCs are unavailable to the UE; and
   based on the control message indicating that the resources are unavailable, determining that a resource availability associated with the particular CC satisfies the resource availability criterion.

4. The method of claim 1, wherein the one or more CC selection criteria include a repetition number criterion, and further including:
   determining that a cardinality of the one or more repetitions associated with the particular CC is less than cardinalities of other sets of repetitions associated with other CCs of the plurality of CCs; and based on the cardinality of the one or more repetitions associated with the particular CC being less than the cardinalities of the other sets of repetitions, determining that the cardinality of the one or more repetitions associated with the particular CC satisfies the repetition number criterion.

5. The method of claim 1, wherein the one or more CC selection criteria include a percentage of available repetitions criterion, and further including:

receiving a control message indicating that resources associated with at least one repetition of another CC of the plurality of CCs are unavailable to the UE; and based on the control message indicating that the resources are unavailable, determining that a percentage of available repetitions associated with the one or more repetitions of the HARQ feedback message satisfies the percentage of available repetitions criterion.

6. The method of claim 1, wherein the one or more CC selection criteria include a CC index value criterion, and further including:

determining that an index value associated with the particular CC is less than other index values associated with other CCs of the plurality of CCs; and based on the index value associated with the particular CC being less than the other index values associated with the other CCs, determining that the index value satisfies the CC index value criterion.

7. An apparatus comprising:

a receiver configured to receive one or more configuration messages indicating a plurality of component carriers (CCs) and one or more CC selection criteria associated with selecting among the plurality of CCs for a hybrid automatic repeat request (HARQ) feedback message and further configured to receive a downlink message, wherein the one or more CC selection criteria include one or more of an end transmission time criterion, a repetition number criterion, or a percentage of available repetitions criterion; and a transmitter configured to transmit, based on the downlink message, one or more repetitions of the HARQ feedback message using a particular CC of the plurality of CCs, wherein the particular CC is selected from the plurality of CCs based on the one or more CC selection criteria.

8. The apparatus of claim 7, wherein the downlink message does not include an indication of the particular CC based on a difference in channel quality between the plurality of CCs being less than a threshold difference, and wherein indicating the one or more CC selection criteria enables carrier switching among the plurality of CCs without the indication of the particular CC.

9. The apparatus of claim 7, wherein the one or more CC selection criteria include an end transmission time criterion, and further including a processor configured to:

determine that an end transmission time associated with the one or more repetitions is to occur sooner than end transmission times of one or more other repetitions transmitted via other CCs of the plurality of CCs; and based on determining that the end transmission time associated with the one or more repetitions is to occur sooner than the end transmission times of the one or more other repetitions, determine that the end transmission time associated with the one or more repetitions satisfies the end transmission time criterion.

10. The apparatus of claim 7, wherein the one or more CC selection criteria include a resource availability criterion, wherein the receiver is further configured to receive a control message indicating that resources associated with at least one repetition of another CC of the plurality of CCs are unavailable, and further including a processor configured to determine, based on the control message indicating that the resources are unavailable, that a resource availability associated with the particular CC satisfies the resource availability criterion.

11. The apparatus of claim 7, wherein the one or more CC selection criteria include a repetition number criterion, and further including a processor configured to:

determine that a cardinality of the one or more repetitions associated with the particular CC is less than cardinalities of other sets of repetitions associated with other CCs of the plurality of CCs; and based on the cardinality of the one or more repetitions associated with the particular CC being less than the cardinalities of the other sets of repetitions, determine that the cardinality of the one or more repetitions associated with the particular CC satisfies the repetition number criterion.

12. The apparatus of claim 7, wherein the one or more CC selection criteria include a percentage of available repetitions criterion, wherein the receiver is further configured to receive a control message indicating that resources associated with at least one repetition of another CC of the plurality of CCs are unavailable, and further including a processor configured to determine, based on the control message indicating that the resources are unavailable, that a percentage of available repetitions associated with the one or more repetitions of the HARQ feedback message satisfies the percentage of available repetitions criterion.

13. The apparatus of claim 7, wherein the one or more CC selection criteria include a CC index value criterion, and further including a processor configured to:

determine that an index value associated with the particular CC is less than other index values associated with other CCs of the plurality of CCs; and based on the index value associated with the particular CC being less than the other index values associated with the other CCs, determine that the index value satisfies the CC index value criterion.

14. The apparatus of claim 7, wherein the one or more CC selection criteria include a resource availability criterion or a CC index value criterion, and wherein the one or more configuration messages further indicate a priority scheme associated with the one or more CC selection criteria.

15. The apparatus of claim 14, wherein the priority scheme indicates that the end transmission time criterion is of a greater priority than the resource availability criterion, the repetition number criterion, the percentage of available repetitions criterion, and the CC index value criterion.

16. The apparatus of claim 15, wherein the particular CC is selected based on determining that an end transmission time associated with the one or more repetitions satisfies the end transmission time criterion.

17. The apparatus of claim 15, wherein the plurality of CCs are associated with a common end transmission time, wherein the priority scheme indicates that the resource availability criterion is of a greater priority than the repetition number criterion, the percentage of available repetitions criterion, and the CC index value criterion.

18. The apparatus of claim 17, wherein the particular CC is selected based on determining that a resource availability associated with the particular CC satisfies the resource availability criterion.

19. The apparatus of claim 17, wherein the plurality of CCs are associated with a common resource availability, wherein the priority scheme indicates that the repetition number criterion is of a greater priority than the percentage of available repetitions criterion and the CC index value criterion.

20. The apparatus of claim 19, wherein the particular CC is selected based on determining that a cardinality of the one or more repetitions satisfies the repetition number criterion.

21. The apparatus of claim 19, wherein the plurality of CCs are associated with a common cardinality of repetitions, wherein the priority scheme indicates that the percentage of available repetitions criterion is of a greater priority than the CC index value criterion.

22. The apparatus of claim 21, wherein the particular CC is selected based on determining that a percentage of available repetitions associated with the one or more repetitions of the HARQ feedback message satisfies the percentage of available repetitions criterion.

23. The apparatus of claim 21, wherein the plurality of CCs are associated with a common percentage of available repetitions, and wherein the particular CC is selected based on the CC index value criterion.

24. A method of wireless communication by a base station, the method comprising:
transmitting one or more configuration messages indicating a plurality of component carriers (CCs) and one or more CC selection criteria associated with selecting among the plurality of CCs for a hybrid automatic repeat request (HARQ) feedback message, wherein the one or more CC selection criteria include one or more of an end transmission time criterion, a repetition number criterion, or a percentage of available repetitions criterion;
transmitting a downlink message; and
receiving, based on the downlink message, one or more repetitions of the HARQ feedback message using a particular CC of the plurality of CCs, wherein the particular CC is selected from the plurality of CCs based on the one or more CC selection criteria.

25. The method of claim 24, further comprising determining that a difference in channel quality between the plurality of CCs is less than a threshold difference, wherein the downlink message does not include an indication of the particular CC based on the difference in channel quality between the plurality of CCs being less than the threshold difference, and wherein indicating the one or more CC selection criteria enables carrier switching among the plurality of CCs without the indication of the particular CC.

26. An apparatus comprising:
a transmitter configured to transmit one or more configuration messages indicating a plurality of component carriers (CCs) and one or more CC selection criteria associated with selecting among the plurality of CCs for a hybrid automatic repeat request (HARQ) feedback message and to transmit a downlink message, wherein the one or more CC selection criteria include one or more of an end transmission time criterion, a repetition number criterion, or a percentage of available repetitions criterion; and
a receiver configured to receive, based on the downlink message, one or more repetitions of a hybrid automatic repeat request (HARQ) feedback message using a particular CC of the plurality of CCs, wherein the particular CC is selected from the plurality of CCs based on the one or more CC selection criteria.

27. The apparatus of claim 26, wherein the one or more CC selection criteria include a resource availability criterion or a CC index value criterion.

28. The apparatus of claim 26, wherein the one or more configuration messages further indicate a priority scheme associated with the one or more CC selection criteria.

29. The method of claim 1, wherein the one or more CC selection criteria include a resource availability criterion.

30. The method of claim 1, further comprising receiving a message disabling CC switching, wherein the one or more repetitions of the HARQ feedback message include one and only one repetition of the HARQ feedback message that is transmitted via a physical uplink control channel (PUCCH).

* * * * *